(12) United States Patent
Kasahara et al.

(10) Patent No.: US 11,862,017 B2
(45) Date of Patent: Jan. 2, 2024

(54) COMMUNICATION SYSTEM, COMMUNICATION METHOD, TERMINAL DEVICE, AND PROGRAM

(71) Applicant: NIPPON TELEGRAPH AND TELEPHONE CORPORATION, Tokyo (JP)

(72) Inventors: Hisatoshi Kasahara, Tokyo (JP); Norihiro Fujimoto, Tokyo (JP); Hitoshi Mizuno, Tokyo (JP); Seiya Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 170 days.

(21) Appl. No.: 17/436,017

(22) PCT Filed: Feb. 21, 2020

(86) PCT No.: PCT/JP2020/006972
§ 371 (c)(1),
(2) Date: Sep. 2, 2021

(87) PCT Pub. No.: WO2020/179487
PCT Pub. Date: Sep. 10, 2020

(65) Prior Publication Data
US 2022/0172615 A1 Jun. 2, 2022

(30) Foreign Application Priority Data
Mar. 5, 2019 (JP) .................................. 2019-039713

(51) Int. Cl.
*G08G 1/09* (2006.01)
*H04W 4/40* (2018.01)

(52) U.S. Cl.
CPC .............. *G08G 1/091* (2013.01); *H04W 4/40* (2018.02)

(58) Field of Classification Search
None
See application file for complete search history.

(56) References Cited

U.S. PATENT DOCUMENTS

| 2016/0245660 A1* | 8/2016 | Winckler ............ B60W 30/143 |
| 2019/0007135 A1* | 1/2019 | Stout .......................... G06T 7/90 |
| 2020/0413483 A1* | 12/2020 | Otaka .................... H04W 76/14 |

(Continued)

FOREIGN PATENT DOCUMENTS

| CA | 2941745 C | * | 1/2019 | ............. H04B 10/11 |
| CN | 208300035 U | * | 12/2018 | |
| CN | 112788565 A | * | 5/2021 | |

(Continued)

OTHER PUBLICATIONS

WHERE. Inc. (2019) "EXBeacon platform" literature [online] Jan. 16, 2019 (Reading Day), website: https://where123.jp/platform.

*Primary Examiner* — Fekadeselassie Girma

(57) ABSTRACT

A communication system (1) includes multiple transmission apparatuses (200) that transmit beacon signals to a moving body (10), and a terminal apparatus (100) that is mounted in the moving body (10) and, upon receiving a beacon signal of a predetermined intensity or more from a transmission apparatus (200), presents information to a user based on the beacon signal of the predetermined intensity or more and a past reception record.

12 Claims, 17 Drawing Sheets

(56) References Cited

U.S. PATENT DOCUMENTS

2023/0114389 A1\* 4/2023 Takeuchi ............... H04B 7/145
                                                                  455/25

FOREIGN PATENT DOCUMENTS

| | | | | |
|---|---|---|---|---|
| EP | 2922144 A1 | * | 9/2015 | ........... G01S 13/781 |
| EP | 3048595 A1 | * | 7/2016 | ............... G01S 1/68 |
| JP | WO2005004510 A1 | * | 8/2006 | ........... H04W 36/32 |
| TW | 200830757 A | * | 7/2008 | .......... H04W 52/265 |
| WO | WO-2016103661 A1 | * | 6/2016 | ............ H04W 4/027 |

\* cited by examiner

Fig. 7

| REFERENCE SIGN | GUIDANCE INFORMATION |
|---|---|
| A_X | TELEPHONE CONSTRUCTION AHEAD. TELEPHONE CONSTRUCTION IS IN PROGRESS AHEAD. |
| B_X | TELEPHONE CONSTRUCTION SITE APPROACHING. TELEPHONE CONSTRUCTION IS NEARBY. |
| C_X | NEAR TELEPHONE CONSTRUCTION SITE. ENTERING TELEPHONE CONSTRUCTION AREA. |
| D_X | NOW AT CONSTRUCTION SITE. TELEPHONE CONSTRUCTION IS IN PROGRESS. |
| E_X | END OF CONSTRUCTION AREA. EXITING CONSTRUCTION AREA. |
| F_X | THANK YOU FOR COOPERATING WITH TELEPHONE CONSTRUCTION. THANK YOU FOR YOUR COOPERATION. |

Fig. 9

| INBOUND | AUDIO |
|---|---|
| Beacon① | TELEPHONE CONSTRUCTION AHEAD. TELEPHONE CONSTRUCTION IS IN PROGRESS AHEAD. |
| Beacon② | TELEPHONE CONSTRUCTION SITE APPROACHING. TELEPHONE CONSTRUCTION IS NEARBY. |
| Beacon③ | NEAR TELEPHONE CONSTRUCTION SITE. ENTERING TELEPHONE CONSTRUCTION AREA. |
| Beacon④ | NOW AT CONSTRUCTION SITE. TELEPHONE CONSTRUCTION IS IN PROGRESS. |
| Beacon⑤ | END OF CONSTRUCTION AREA. EXITING CONSTRUCTION AREA. |
| Beacon⑥ | THANK YOU FOR COOPERATING WITH TELEPHONE CONSTRUCTION. THANK YOU FOR YOUR COOPERATION. |

| OUTBOUND | AUDIO |
|---|---|
| Beacon⑥ | TELEPHONE CONSTRUCTION AHEAD. TELEPHONE CONSTRUCTION IS IN PROGRESS AHEAD. |
| Beacon⑤ | TELEPHONE CONSTRUCTION SITE APPROACHING. TELEPHONE CONSTRUCTION IS NEARBY. |
| Beacon④ | NEAR TELEPHONE CONSTRUCTION SITE. ENTERING TELEPHONE CONSTRUCTION AREA. |
| Beacon③ | NOW AT CONSTRUCTION SITE. TELEPHONE CONSTRUCTION IS IN PROGRESS. |
| Beacon② | END OF CONSTRUCTION AREA. EXITING CONSTRUCTION AREA. |
| Beacon① | THANK YOU FOR COOPERATING WITH TELEPHONE CONSTRUCTION. THANK YOU FOR YOUR COOPERATION. |

COMMUNICATION SYSTEM, COMMUNICATION METHOD, TERMINAL DEVICE, AND PROGRAM

CROSS-REFERENCE TO RELATED APPLICATIONS

This application is a U.S. 371 Application of International Patent Application No. PCT/JP2020/006972, filed on 21 Feb. 2020, which application claims priority to and the benefit of JP Application No. 2019-039713, filed on 5 Mar. 2019, the disclosures of which are hereby incorporated herein by reference in their entireties.

TECHNICAL FIELD

The present invention relates to a communication system, a communication method, a terminal apparatus, and a program.

BACKGROUND ART

Conventionally, a communication system has been known in which, at a department store or the like, product information and the like are presented to a user by bringing a terminal apparatus including a near-field wireless communication function such as Bluetooth (registered trademark) near a product to which a beacon is attached (see FIG. 10).

Also, a VICS (registered trademark) (Vehicle Information and Communication System) has been known in which FM multi-broadcast, a radio-wave beacon, an optical beacon, or the like is used to display traffic information such as congestion and traffic regulations in real time on a car navigation mounted in a vehicle traveling on a road that is under construction. Also, an EXBeacon platform has been known in which a network that connects items is easily constructed by arranging an EXBeacon equipped with a "flood-type mesh network" through which terminals mutually communicate, in a building facility (see NPL 1).

CITATION LIST

Non-Patent Literature

[NPL 1] WHERE Corporation, "EXBeacon Platform", [online], [searched for on Mar. 4, 2019], Internet <URL: https://where123.jp/platform>

SUMMARY OF THE INVENTION

Technical Problem

However, in a conventional communication system, beacons and information are associated in a one-to-one manner, and therefore suitable information cannot be provided to the user in some cases.

For example, as shown in FIG. 11, the conventional communication system has been problematic in that although a driver of a vehicle traveling in an inbound lane can receive information such as "Construction site ahead. Please be careful.", "Now at construction site. Traffic is one-way.", "End of construction site.", and "Thank you for your cooperation" in the correct order, a driver of a vehicle traveling in an outbound lane receives these pieces of information in the wrong order. There has been a problem in that when the number of beacons in the system is increased in order to present suitable information to a user, a radio-wave transmission range or the like needs to be set for each beacon based on the road width and the number of lanes, and cost and labor will be incurred.

An object of the present invention created in view of these circumstances is to provide a communication system, a communication method, a terminal apparatus, and a program for presenting suitable information to a user without incurring cost and labor.

Means for Solving the Problem

In order to resolve the above-described problem, a communication system according to the present invention includes: a plurality of transmission apparatuses configured to transmit beacon signals to a moving body; and a terminal apparatus that is mounted in the moving body and is configured to, upon receiving a beacon signal of a predetermined intensity or more from a said transmission apparatus, present information to a user based on the beacon signal of the predetermined intensity or more and a past reception record.

Also, in order to resolve the above-described problem, a communication method according to the present invention is a communication method for a communication system including a plurality of transmission apparatuses and a terminal apparatus mounted in a moving body, the communication method including: a step of the transmission apparatuses transmitting beacon signals to the moving body; and a step of, upon receiving a beacon signal of a predetermined intensity or more from a said transmission apparatus, the terminal apparatus presenting information to a user based on the beacon signal of the predetermined intensity or more and a past reception record.

Also, in order to resolve the above-described problem, a terminal apparatus according to the present invention is a terminal apparatus to be mounted in a moving body to which beacon signals are transmitted from a plurality of transmission apparatuses, the terminal apparatus including: a reception unit configured to receive a beacon signal of a predetermined intensity or more from a said transmission apparatus; a storage unit configured to store a reception record of the beacon signal of the predetermined intensity or more; a control unit configured to determine information based on the beacon signal of the predetermined intensity or more and a past reception record; and an output unit configured to present the information to a user.

Also, in order to resolve the above-described problem, a program according to the present invention causes a computer to function as the above-described terminal apparatus.

Effects of the Invention

According to the present invention, it is possible to present suitable information to a user without incurring cost or labor.

BRIEF DESCRIPTION OF DRAWINGS

FIG. 7 is a diagram showing an example of information according to an embodiment of the present invention.

FIG. 9 is a diagram showing an example of a verification result obtained using a communication system according to an embodiment of the present invention.

DESCRIPTION OF EMBODIMENTS

Hereinafter, an embodiment of the present invention will be described in detail with reference to the drawings.

Configuration of Communication System 1

Figure 1:
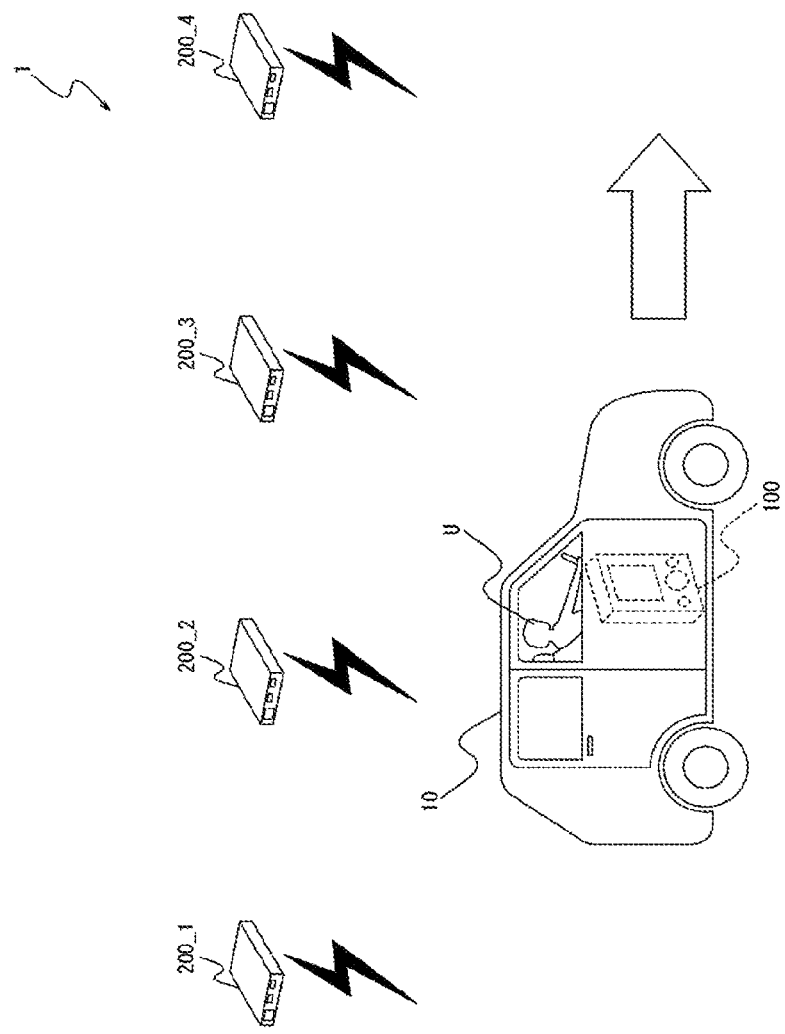
FIG. 1 is a diagram showing an example of a configuration of a communication system according to an embodiment of the present invention.

A communication system 1 according to the present embodiment will be described with reference to FIG. 1. FIG. 1 is a diagram showing an example of a configuration of the communication system 1 according to the present embodiment.

As shown in FIG. 1, the communication system 1 includes a terminal apparatus 100 that is mounted in a moving body and multiple transmission apparatuses 200. Note that in the present embodiment, a case in which the moving body is a vehicle 10 will be described as an example, but the moving body is not limited to the vehicle 10.

The terminal apparatus 100 is a terminal possessed by a user U (e.g., the driver of the vehicle 10), and for example, is a smart device such as a smartphone or a tablet PC (Personal Computer). For example, the terminal apparatus 100 includes a near-field wireless communication function such as Bluetooth (registered trademark), and receives a beacon signal from the transmission apparatus 200. For example, the beacon signal is a wireless signal that includes a transmission source ID, which is transmission source identification information for identifying the transmission source, and the like.

Upon receiving a beacon signal of a predetermined intensity or more from one transmission apparatus 200, the terminal apparatus 100 presents information to the user U based on the beacon signal of the predetermined intensity or more, and a past reception record received from another transmission apparatus 200. The predetermined intensity is a radio-wave intensity of a beacon signal according to which the terminal apparatus 100 can present the information to the user. The reception record is, for example, a record including a transmission source ID of the beacon signal, a reception position of the beacon signal, a reception time of the beacon signal, and the like. The information is, for example, guidance information such as "Construction site ahead. Please be careful", "Now at construction site. Traffic is one-way.", "End of construction site.", and "Thank you for your cooperation.".

For example, the user U installs a predetermined application in the terminal apparatus 100 via a network. A developer who adopts the communication system 1, such as a construction site management company, creates a program in which the transmission source of the beacon signal of the predetermined intensity or more and the guidance information are associated, and provides the program to the user U as an application for presenting the guidance information.

The transmission apparatus 200 is rectangular and is supplied with power by a button battery or the like. For example, the transmission apparatus 200 can be attached to a construction sign, a road sign, or the like. For example, the transmission apparatus 200 can communicate with the terminal apparatus 100 including a near-field wireless communication function such as Bluetooth (registered trademark), and transmits a beacon signal to the terminal apparatus 100 mounted in the vehicle 10. There is no particular limitation on the shape of the transmission apparatus 200, and for example, various shapes such as a circular shape, an elliptical shape, and a square shape can be used.

Note that although a case in which there is one terminal apparatus 100 and four transmission apparatuses 200 was described as an example using FIG. 1, there is no particular limitation to these numbers. There may be one or multiple terminal apparatuses 100. There need only be at least multiple transmission apparatuses 200.

Configuration of Terminal Apparatus 100

Figure 2:
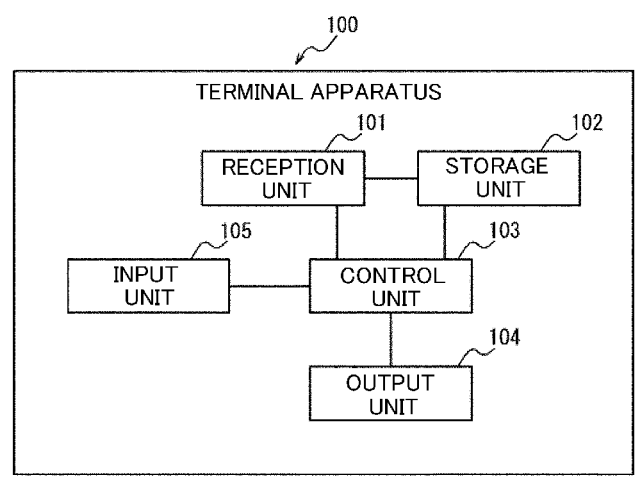
FIG. 2 is a block diagram showing an example of a configuration of a terminal apparatus according to an embodiment of the present invention.

Next, the terminal apparatus 100 according to the present embodiment will be described with reference to FIG. 2. FIG. 2 is a block diagram showing an example of a configuration of the terminal apparatus 100 according to the present embodiment.

The terminal apparatus 100 includes a reception unit 101, a storage unit 102, a control unit 103, an output unit 104, and an input unit 105.

The reception unit 101 receives a beacon signal from multiple transmission apparatuses 200. For example, if the reception unit 101 receives a beacon signal of a predetermined intensity or more from a predetermined transmission apparatus 200, or for example, a first transmission apparatus 200_1, the reception unit 101 outputs a reception signal for the beacon signal of the predetermined intensity or more to the storage unit 102 and the control unit 103. For example, if the reception unit 101 receives a beacon signal of an intensity smaller than the predetermined intensity from a predetermined transmission apparatus 200, or for example, the first transmission apparatus 200_1, the reception unit 101 does not output a reception signal for the beacon signal of the intensity smaller than the predetermined intensity to the storage unit 102 and the control unit 103.

There is no particular limitation on the storage unit 102 as long as the storage unit 102 has a function of storing various types of information, and for example, may be a DRAM (Dynamic Random Access Memory), an HDD (Hard Disk Drive), or the like. The storage unit 102 stores a reception record based on the reception signal input from the reception unit 101. The storage unit 102 stores the reception record, as well as, for example, the guidance information, a program in which the transmission source of the beacon signal of the predetermined intensity or more and the guidance information are associated with each other, various types of programs, various types of information, and various types of applications needed in order for the control unit 103 to execute various types of processing, and the like.

The control unit 103 includes, for example, a CPU (Central Processing Unit), a memory, and the like, and controls operations of the units included in the terminal apparatus 100. The control unit 103 implements various types of processing by executing a predetermined program expanded to a memory or the like.

The control unit 103 determines the guidance information based on the reception signal input from the reception unit 101 and a past reception record stored in the storage unit 102. Then, the control unit 103 generates a control signal based on the guidance information and outputs the generated control signal to the output unit 104.

Specifically, when the reception unit 101 receives a beacon signal of a predetermined intensity or more from one transmission apparatus 200, the control unit 103 determines whether or not there is a reception record that is stored in the storage unit 102 and was received from another transmission apparatus 200 in the past.

For example, if it is determined that there is no past reception record stored in the storage unit 102, the control unit 103 determines the guidance information, or for example, "Construction site ahead. Please be careful.", which is to be presented to the user U who is in possession of the terminal apparatus 100 mounted in the vehicle 10 that is approaching a predetermined transmission apparatus 200, or for example, the first transmission apparatus 200_1. Then, the control unit 103 generates a control signal based on the guidance information and outputs the generated control signal to the output unit 104.

For example, if it is determined that there is a past reception record stored in the storage unit 102, the control unit 103 determines the transmission source of the beacon signal of the predetermined intensity or more that is included in the past reception record.

For example, if it is determined that the transmission source of the beacon signal of the predetermined intensity or more included in the immediately-previous reception record is a transmission apparatus 200, or for example, the second transmission apparatus 200_2, which is adjacent to the predetermined transmission apparatus 200, or for example, the first transmission apparatus 200_1, that is, if it is determined that the beacon signal of the predetermined intensity or more was received from the transmission apparatus 200, or for example, the second transmission apparatus 200_2, which is adjacent to the predetermined transmission apparatus 200, or for example, the first transmission apparatus 200_1, immediately before receiving the beacon signal of the predetermined intensity or more from the predetermined transmission apparatus 200, or for example, the first transmission apparatus 200_1, the control unit 103 determines the guidance information, or for example, "Thank you for your cooperation.", which is to be presented to the user U who is in possession of the terminal apparatus 100 mounted in the vehicle 10 that is approaching the predetermined transmission apparatus 200, or for example, the first transmission apparatus 200_1. Then, the control unit 103 generates a control signal based on the guidance information and outputs the generated control signal to the output unit 104.

For example, if it is determined that the transmission sources of the beacon signal of the predetermined intensity or more included in the immediately-previous reception record are transmission apparatuses 200, or for example, the third transmission apparatus 200_3 and the fourth transmission apparatus 200_4, which are not adjacent to the predetermined transmission apparatus 200, or for example, the first transmission apparatus 200_1, that is, if it is determined that the beacon signal of the predetermined intensity or more was received from the transmission apparatuses 200, or for example, the third transmission apparatus 200_3 and the fourth transmission apparatus 200_4, which are not adjacent to the predetermined transmission apparatus 200, or for example, the first transmission apparatus 200_1, immediately before receiving the beacon signal of the predetermined intensity or more from the predetermined transmission apparatus 200, or for example, the first transmission apparatus 200_1, the control unit 103 determines that the guidance information is not to be presented to the user U who is in possession of the terminal apparatus 100 mounted in the vehicle 10 that is approaching the predetermined transmission apparatus 200, or for example, the first transmission apparatus 200_1. Then, the control unit 103 generates a control signal based on the determination that the guidance information is not to be presented, and outputs the generated control signal to the output unit 104.

Note that if the state in which the reception unit 101 does not receive the beacon signal of the predetermined intensity or more from the predetermined transmission apparatus 200, or for example, the first transmission apparatus 200_1, continues for a predetermined amount of time (e.g., three minutes) or more, the control unit 103 deletes the past reception record stored in the storage unit 102. This makes it possible to suppress malfunction of the communication system 1 resulting from an unneeded past reception record stored in the storage unit 102.

The output unit 104 presents the guidance information to the user U based on the control signal input from the control unit 103. For example, the output unit 104 presents the guidance information to the user U by outputting the guidance information through audio. For example, the output unit 104 presents the guidance information to the user U by outputting the guidance information through text and numerals. For example, the output unit 104 presents the guidance information to the user U by outputting the guidance information through video.

The output unit 104 may be any device as long as it can present the guidance information to the user U, and examples thereof include a speaker, a wireless earphone, a liquid crystal display, an organic EL display, and an inorganic EL display. Note that when the guidance information is presented to the user U, the output unit 104 may also be set so as to generate a vibration rumble or a notification sound.

The input unit 105 may be any device as long as various operations can be performed by the user U, and examples thereof include a touch panel and a software keyboard. An application for presenting the guidance information to the user U is installed in the terminal apparatus 100 due to the input unit 105 being operated by the user U.

Note that a computer can be suitably used to cause functioning as the above-described terminal apparatus 100, and such a computer can realize this by storing a program describing the content of the processing for realizing the functions of the terminal apparatus 100 in a database of the computer, and reading out and executing the program using a CPU (Central Processing Unit) and a DSP (Digital Signal Processor) of the computer.

This program may also be stored in a computer-readable medium and may be provided via a network. If a computer-readable medium is used, the program can be installed in the computer. Here, the computer-readable medium in which the program is stored may also be a non-transitory recording medium. Although there is no limitation to the non-transitory recording medium, it may be, for example, a recording medium such as a CD-ROM or a DVD-ROM.

Configuration of Transmission Apparatus 200

Figure 3:
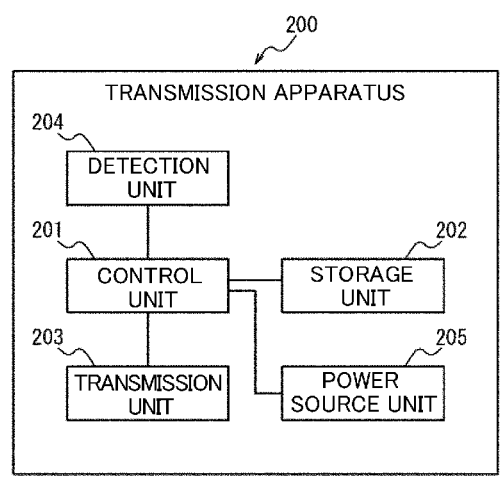
FIG. 3 is a block diagram showing an example of a configuration of a transmission apparatus according to an embodiment of the present invention.

Next, a configuration of the transmission apparatus 200 according to the present embodiment will be described with reference to FIG. 3. FIG. 3 is a block diagram showing an example of the transmission apparatus 200 according to the present embodiment.

The transmission apparatus 200 includes a control unit 201, a storage unit 202, a transmission unit 203, a detection unit 204, and a power source unit 205.

The control unit 201 includes, for example, a CPU, a memory, and the like, and controls the operations of the units included in the transmission apparatus 200. The control unit 201 implements various types of processing by executing a predetermined program expanded to a memory or the like.

The control unit 201 reads out a transmission source ID and the like from the storage unit 202 and outputs the control signal for transmitting the beacon signal to the terminal apparatus 100 to the transmission unit 203. For example, the control unit 201 outputs, to the transmission unit 203, a control signal for periodically (e.g., every several hundreds of milliseconds to every several seconds) transmitting the beacon signal to the terminal apparatus 100. For example, the control unit 201 outputs a control signal for transmitting the beacon signal to the terminal apparatus 100 to the transmission unit 203 based on the detection signal input from the detection unit 204.

There is no particular limitation on the storage unit 202 as long as it has a function of storing various types of information, and for example, may be a DRAM, an HDD, or the like. The storage unit 202 stores, for example, a transmission source ID, various types of programs and various types of information that are needed for the control unit 201 to execute various types of processing, and the like.

The transmission unit 203 transmits the beacon signal to the terminal apparatus 100 based on the control signal input from the control unit 201. For example, the transmission unit 203 periodically transmits the beacon signal to the terminal apparatus 100. For example, the transmission unit 203 transmits the beacon signal to the transmission apparatus 100 if a predetermined condition, such as the terminal apparatus 100 approaching the transmission apparatus 200 by a predetermined distance or more, is satisfied.

The detection unit 204 is, for example, a proximity sensor. The detection unit 204 detects the approach of the terminal apparatus 100 mounted in the vehicle 10 to the transmission apparatus 200 and outputs the detection signal to the control unit 201. There is no particular limitation on the configuration of the detection unit 204.

For example, the power source unit 205 is a button battery that can be removed from the transmission apparatus 200, and supplies power to the units of the transmission apparatus 200. Note that the transmission apparatus 200 is small and uses a small amount of power overall, and therefore the power can be sufficiently supplied to the units of the transmission apparatus 200 even with a button battery.

With the communication system 1 according to the present embodiment, upon receiving a beacon signal of a predetermined intensity or more from the transmission apparatus 200, the terminal apparatus 100 presents the guidance information to the user based on the beacon signal of the predetermined intensity or more and the past reception record. That is, in the terminal apparatus 100, information that is suitable for the user can be determined and presented to the user, and therefore it is possible to realize the communication system 1 that presents suitable information to the user without incurring cost or labor.

Communication Method of Communication System 1

Figure 4:
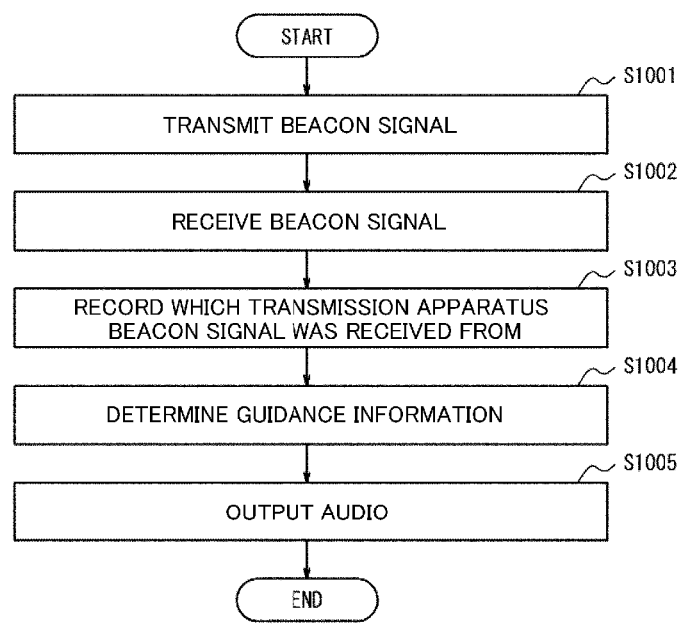
FIG. 4 is a flowchart showing an example of a communication method according to an embodiment of the present invention.
Figure 5:
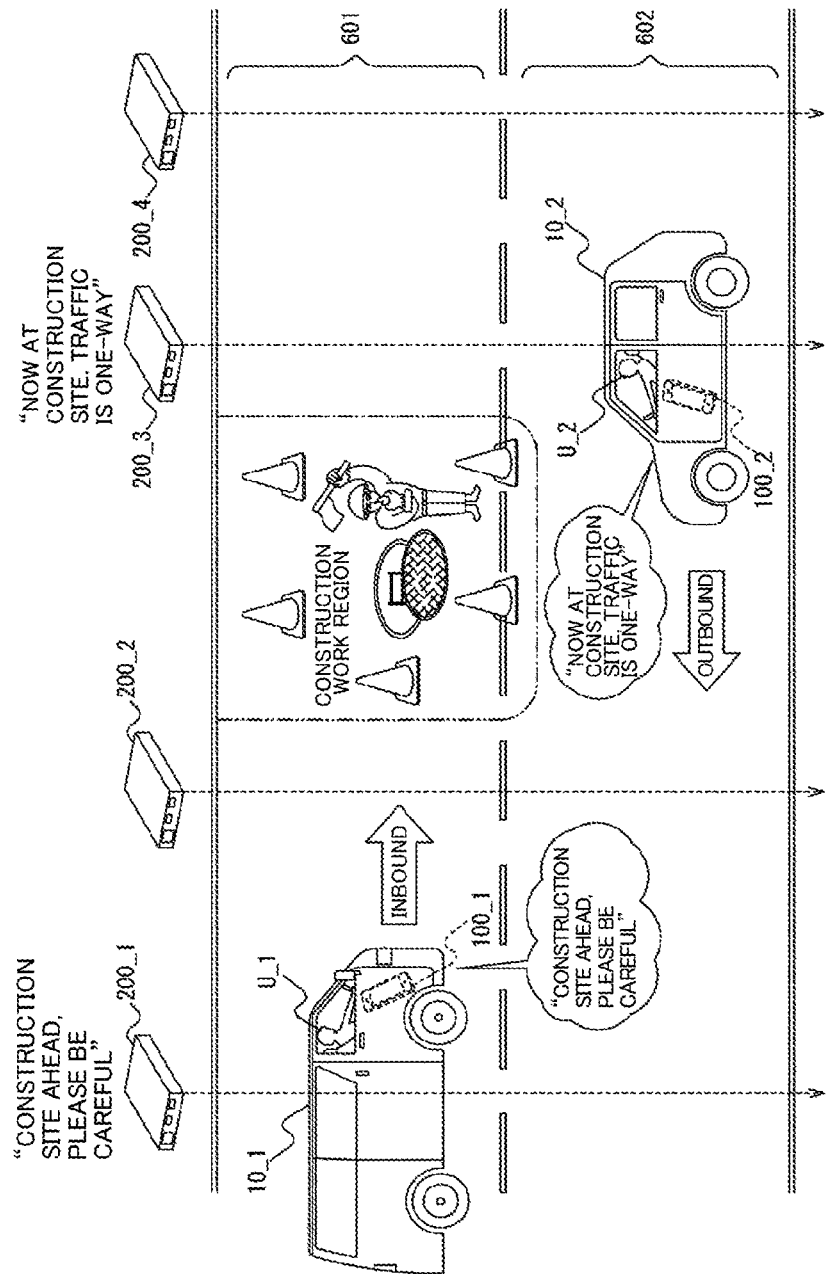
FIG. 5 is a is a diagram showing an application example of a communication method according to an embodiment of the present invention.

Next, the communication method of the communication system 1 according to the present embodiment will be described with reference to FIGS. 4 and 5. Description will be given taking, as an example, a communication method used in the case where the communication system 1 is applied to a transmission apparatus installed on a road that is under construction, and a terminal apparatus possessed by a driver of a vehicle traveling on the road that is under construction.

In step S1001, the transmission apparatus 200 transmits the beacon signal to the vehicle 10. For example, the first transmission apparatus 200_1 transmits the beacon signal to a vehicle 10_1 traveling in an inbound lane 601. For example, the third transmission apparatus 200_3 transmits the beacon signal to a vehicle 10_2 traveling in an outbound lane 602.

In step S1002, the terminal apparatus 100 mounted in the vehicle 10 receives the beacon signal of the predetermined intensity or more from the transmission apparatus 200. For example, the terminal apparatus 100_1 mounted in the vehicle 10_1 receives the beacon signal of the predetermined intensity or more from the first transmission apparatus 200_1. For example, the terminal apparatus 100_2 mounted in the vehicle 10_2 receives the beacon signal of the predetermined intensity or more from the third transmission apparatus 200_3.

In step S1003, the terminal apparatus 100 mounted in the vehicle 10 stores a reception record of the beacon signal of the predetermined intensity or more. For example, the terminal apparatus 100_1 mounted in the vehicle 10_1 stores the reception record of the beacon signal of the predetermined intensity or more, the transmission source of which is the first transmission apparatus 200_1. For example, the terminal apparatus 100_2 mounted in the vehicle 10_2 stores the reception record of the beacon signal of the predetermined intensity or more, the transmission source of which is the third transmission apparatus 200_3.

In step S1004, the terminal apparatus 100 mounted in the vehicle 10 determines the guidance information based on the beacon signal of the predetermined intensity or more, which was received from the predetermined transmission apparatus 200, and the past reception record.

For example, upon receiving the beacon signal of the predetermined intensity or more from the first transmission apparatus 200_1, the terminal apparatus 100_1 mounted in the vehicle 10_1 determines whether or not there is a past reception record. If it is determined that there is no past reception record, the terminal apparatus 100_1 determines "Construction site ahead. Please be careful" as the guidance information that is to be presented to the user U_1 who is in possession of the terminal apparatus 100_1 (see FIG. 5).

For example, upon receiving the beacon signal of the predetermined intensity or more from the third transmission apparatus 200_3, the terminal apparatus 100_2 mounted in the vehicle 10_2 determines whether or not there is a past reception record. If it is determined that there is a past reception record, the terminal apparatus 100_2 determines the transmission source of the beacon signal of the predetermined intensity or more that is included in the past reception record. For example, if it is determined that the transmission source of the beacon signal of the predetermined intensity or more that is included in the immediately-previous reception record is the fourth transmission apparatus 200_4, that is, if it is determined that the beacon signal of the predetermined intensity or more was received from the fourth transmission apparatus 200_4 immediately before receiving the beacon signal of the predetermined intensity or more from the third transmission apparatus 200_3, the terminal apparatus 100_2 determines "Now at construction site. Traffic is one-way." as the guidance information to be presented to the user U_2 who is in possession of the terminal apparatus 100_2 (see FIG. 5).

In step S1005, the terminal apparatus 100 mounted in the vehicle 10 presents the guidance information to the user U. For example, the terminal apparatus 100_1 mounted in the vehicle 10_1 presents the guidance information "Construction site ahead. Please be careful." to the user U_1 by outputting the guidance information through audio. For example, the terminal apparatus 100_2 mounted in the vehicle 10_2 presents the guidance information "Now at construction site. Traffic is one-way." to the user U_2 by outputting the guidance information through audio.

According to the communication method according to the present embodiment, it is possible to present suitable information to the user without incurring cost and labor. Accordingly, since it is possible to prevent collision, physical injury, and the like, which occur due to carelessness of the user, falling asleep while driving, or the like, it is possible to increase the convenience and safety of transportation.

Verification

Next, it will actually be verified whether or not suitable information is presented to the user by the communication system 1 according to the present embodiment.

Figure 6A:
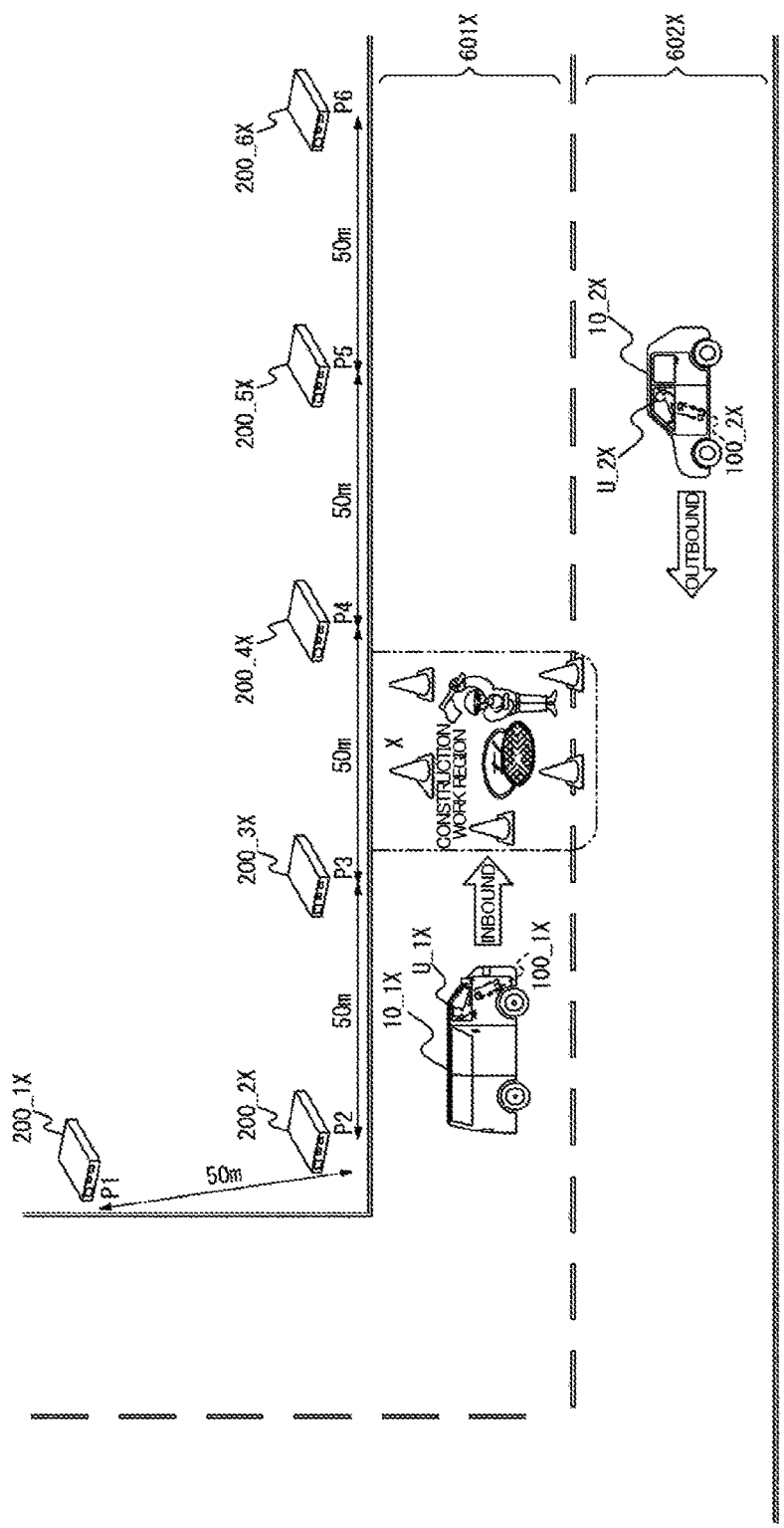
FIG. 6A is a diagram showing an application example of a communication system according to an embodiment of the present invention.

First, a tester prepares six transmission apparatuses 200 and assigns numbers to the six transmission apparatuses 200 (see FIG. 6A). For example, the tester assigns the number "first transmission apparatus 200_1X" to the first transmission apparatus, assigns the number "second transmission apparatus 200_2X" to the second transmission apparatus, assigns the number "third transmission apparatus 200_3X" to the third transmission apparatus, assigns the number "fourth transmission apparatus 200_4X" to the fourth transmission apparatus, assigns the number "fifth transmission apparatus 200_5X" to the fifth transmission apparatus, and assigns the number "sixth transmission apparatus 200_6X" to the sixth transmission apparatus.

Next, on the roadside of an inbound lane 601X in which a construction work region X is present, the tester installs six construction signs such that the shortest distance between construction signs is 50 m (see FIG. 6A). For example, the tester installs the first construction sign at a position P1 on the roadside, installs the second construction sign at a position P2 on the roadside, installs the third construction sign at a position P3 on the roadside, installs the fourth construction sign at a position P4 on the roadside, installs the fifth construction sign at a position P5 on the roadside, and installs the sixth construction sign at a position P6 on the roadside.

Figure 6B:
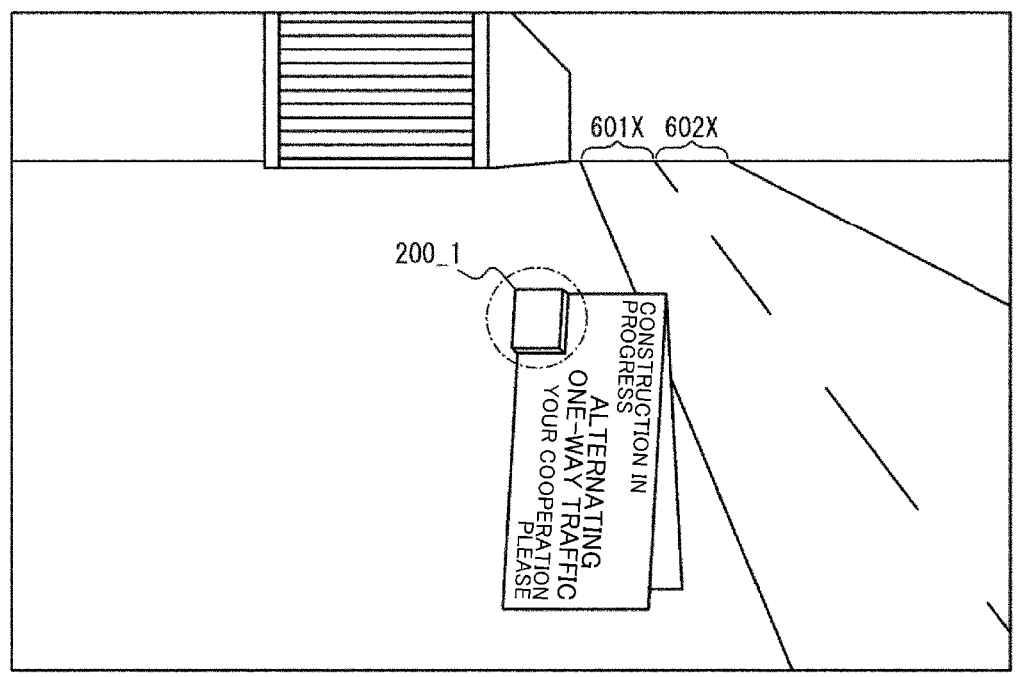
FIG. 6B is a diagram showing an example of a transmission apparatus attached to a road sign.

Next, the tester attaches a transmission apparatus 200 to each of the six construction signs. For example, the tester attaches the first transmission apparatus 200_1X to the construction sign installed at the position P1 (see FIG. 6B), attaches the second transmission apparatus 200_2X to the construction sign installed at the position P2, attaches the third transmission apparatus 200_3X to the construction sign installed at the position P3, attaches the fourth transmission apparatus 200_4X to the construction sign installed at the position P4, attaches the fifth transmission apparatus 200_5X to the construction sign installed at the position P5, and attaches the sixth transmission apparatus 200_6X to the construction sign installed at the position P6.

Next, the tester installs an application for presenting the guidance information to the user U in the terminal apparatus 100. Note that there may be one or multiple pieces of guidance information associated with a transmission source of a beacon signal of a predetermined intensity or more.

FIG. 7 is a diagram showing an example of guidance information to be presented by the terminal apparatus 100 to the user. The guidance information A_X is "Telephone construction ahead. Telephone construction is in progress ahead.". The guidance information B_X is "Telephone construction site approaching. Telephone construction is nearby.". The guidance information C_X is "Near telephone construction site. Entering telephone construction area.". The guidance information D_X is "Now at construction site. Telephone construction is in progress.". The guidance information E_X is "End of construction area. Exiting construction area.". The guidance information F_X is "Thank you for cooperating with telephone construction. Thank you for your cooperation.".

For example, the first transmission apparatus 200_1X or the sixth transmission apparatus 200_6X, which are transmission sources of beacon signals of a predetermined intensity or more, and the guidance information A_X or guidance information F_X are stored in association with each other in the terminal apparatus 100. For example, the second transmission apparatus 200_2X or the fifth transmission apparatus 200_5X, which are transmission sources of beacon signals of a predetermined intensity or more, and the guidance information B_X or Guidance information E_X are stored in association with each other in the terminal apparatus 100. For example, the third transmission apparatus 200_3X or the fourth transmission apparatus 200_4X, which are transmission sources of beacon signals of a predetermined intensity or more, and the guidance information C_X or guidance information D_X are stored in association with each other in the terminal apparatus 100.

Next, the tester has a user U_1X drive a vehicle 10_1X in which the terminal apparatus 100_1X is mounted and travel in an inbound lane 601X. Also, the tester has a user U_2X drive a vehicle 10_2X in which the terminal apparatus 100_2X is mounted and travel in an outbound lane 602X.

Here, an example of processing performed by the terminal apparatus 100_1X mounted in the vehicle 10_1X traveling in the inbound lane 601X and the terminal apparatus 100_2X mounted in the vehicle 10_2X traveling in the outbound lane 602X will be described with reference to FIG. 8.

Figure 8A:
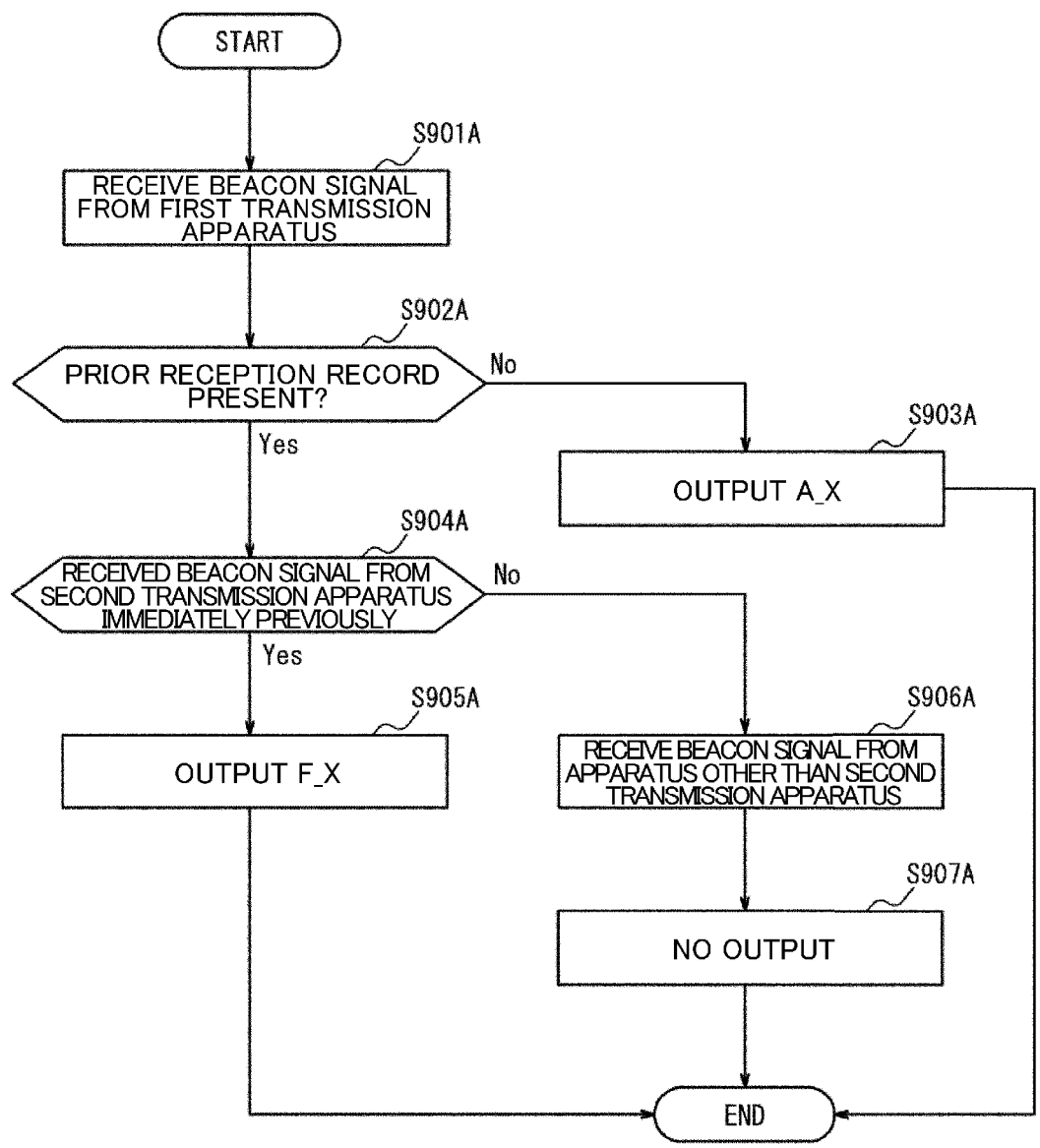
FIG. 8A is a flowchart showing an example of a processing method of a terminal apparatus according to as embodiment of the present invention.

Processing Performed when Terminal Apparatus 100 Receives Beacon Signal of Predetermined Intensity or more from First Transmission Apparatus 200_1X As shown in FIG. 8A, in step S901A, the terminal apparatus 100_1X and the terminal apparatus 100_2X receive a beacon signal of a predetermined intensity or more from the first transmission apparatus 200_1X installed at the position P1.

In step S902A, the terminal apparatus 100_1X and the terminal apparatus 100_2X determine whether or not there is a past reception record. If the terminal apparatus 100_1X and the terminal apparatus 100_2X determine that there is no past reception record (step S902A→No), the processing advances to step S903A. If the terminal apparatus 100_1X and the terminal apparatus 100_2X determine that there is a past reception record (step S902A→Yes), the processing advances to step S904A.

In step S903A, the terminal apparatus 100_1X outputs the guidance information A_X.

In step S904A, the terminal apparatus 100_2X determines whether or not the transmission source of the beacon signal of the predetermined intensity or more that is included in the immediately-previous reception record is the second transmission apparatus 200_2X, that is, whether or not the beacon signal of the predetermined intensity or more was received from the second transmission apparatus 200_2X immediately before receiving the beacon signal of the predetermined intensity or more from the first transmission apparatus 200_1X. If the terminal apparatus 100_2X determines that the beacon signal of the predetermined intensity or more was received from the second transmission apparatus 200_2X immediately before receiving the beacon signal of the predetermined intensity or more from the first transmission apparatus 200_1X (step S904A→Yes), the processing advances to step S905A. If the terminal apparatus 100_2X determines that the beacon signal of the predetermined intensity or more was not received from the second transmission apparatus 200_2X immediately before receiving the beacon signal of the predetermined intensity or more from the first transmission apparatus 200_1X (step S904A→No), the processing advances to step S906A.

In step S905A, the terminal apparatus 100_2X outputs the guidance information F_X.

In step S906A, the terminal apparatus 100_2X determines whether or not the transmission source of the beacon signal of the predetermined intensity or more that is included in the immediately-previous reception record is a transmission apparatus other than the second transmission apparatus 200_2X, that is, whether or not the beacon signal of the predetermined intensity or more was received from a transmission apparatus other than the second transmission apparatus 200_2X immediately before receiving the beacon signal of the predetermined intensity or more from the first transmission apparatus 200_1X.

In step S907A, the terminal apparatus 100_2X does not output the guidance information.

Figure 8B:
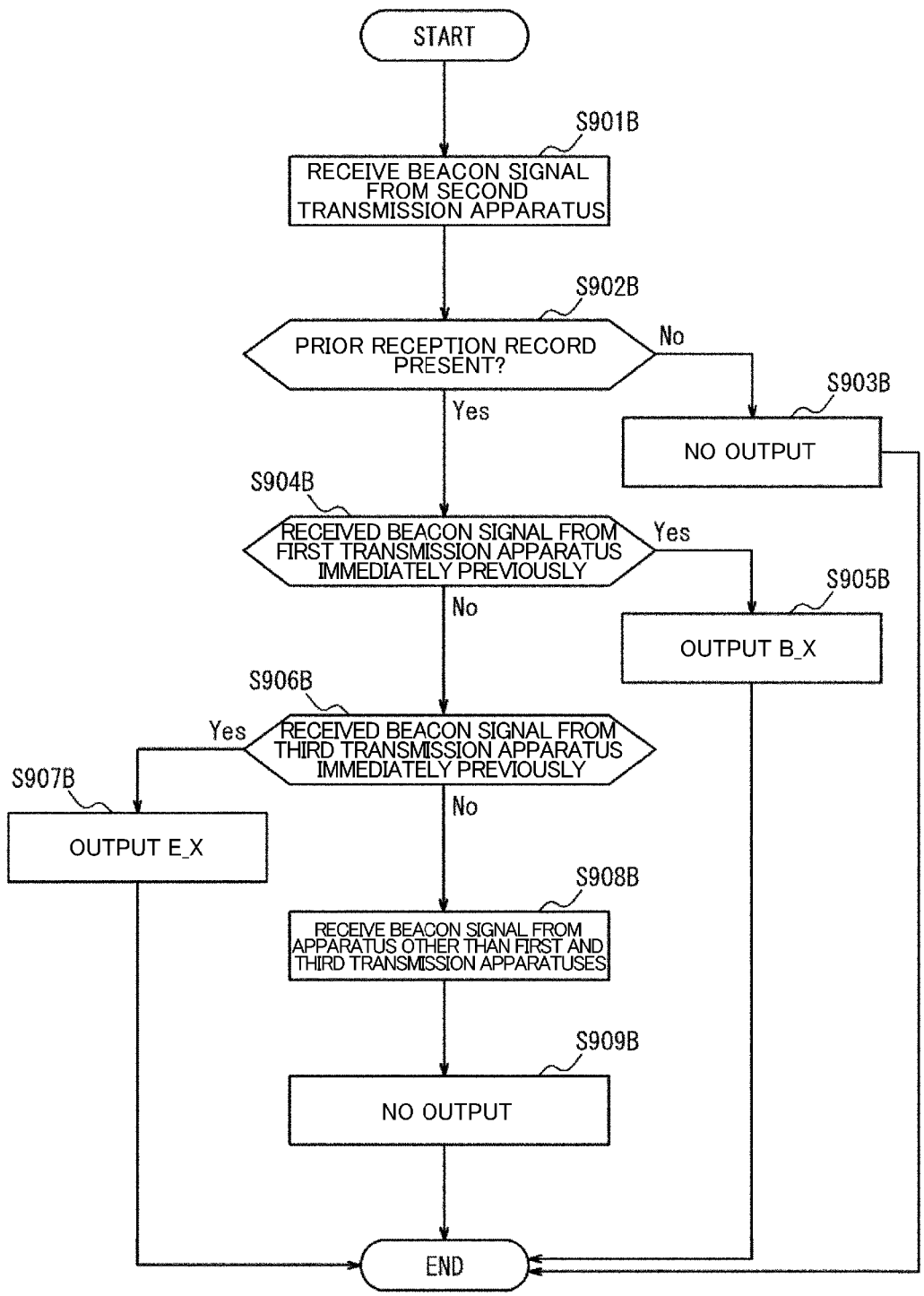
FIG. 8B is a flowchart showing an example of a processing method of a terminal apparatus according to an embodiment of the present invention.

Processing Performed when Terminal Apparatus 100 Receives Beacon Signal of Predetermined Intensity or more from Second Transmission Apparatus 200_2X As shown in FIG. 8B, in step S901B, the terminal apparatus 100_1X and the terminal apparatus 100_2X receive a beacon signal of a predetermined intensity or more from the second transmission apparatus 200_2X installed at the position P2.

In step S902B, the terminal apparatus 100_1X and the terminal apparatus 100_2X determine whether or not there is a past reception record. If the terminal apparatus 100_1X and the terminal apparatus 100_2X determine that there is no past reception record (step S902B→No), the processing advances to step S903B. If the terminal apparatus 100_1X and the terminal apparatus 100_2X determine that there is a past reception record (step S902B→Yes), the processing advances to step S904B.

In step S903B, the terminal apparatus 100_1X and the terminal apparatus 100_2X do not output the guidance information.

In step S904B, the terminal apparatus 100_1X and the terminal apparatus 100_2X determine whether or not the transmission source of the beacon signal of the predetermined intensity or more that is included in the immediately-previous reception record is the first transmission apparatus 200_1X, that is, whether or not the beacon signal of the predetermined intensity or more was received from the first transmission apparatus 200_1X immediately before receiving the beacon signal of the predetermined intensity or more from the second transmission apparatus 200_2X. If the terminal apparatus 100_1X and the terminal apparatus 100_2X determine that the beacon signal of the predetermined intensity or more was received from the first transmission apparatus 200_1X immediately before receiving the beacon signal of the predetermined intensity or more from the second transmission apparatus 200_2X (step S904B→Yes), the processing advances to step S905B. If the terminal apparatus 100_1X and the terminal apparatus 100_2X determine that the beacon signal of the predetermined intensity or more was not received from the first transmission apparatus 200_1X immediately before receiving the beacon signal of the predetermined intensity or more from the second transmission apparatus 200_2X (step S904B→No), the processing advances to step S906B.

In step S905B, the terminal apparatus 100_1X outputs the guidance information B_X.

In step S906B, the terminal apparatus 100_2X determines whether or not the transmission source of the beacon signal of the predetermined intensity or more that is included in the immediately-previous reception record is the third transmission apparatus 200_3X, that is, whether or not the beacon signal of the predetermined intensity or more was received from the third transmission apparatus 200_3X immediately before receiving the beacon signal of the predetermined intensity or more from the second transmission apparatus 200_2X. If the terminal apparatus 100_2X determines that the beacon signal of the predetermined intensity or more was received from the third transmission apparatus 200_3X immediately before receiving the beacon signal of the predetermined intensity or more from the second transmission apparatus 200_2X (step S906B→Yes), the processing advances to step S907B. If the terminal apparatus 100_2X determines that the beacon signal of the predetermined intensity or more was not received from the third transmission apparatus 200_3X immediately before receiving the beacon signal of the predetermined intensity or more from the second transmission apparatus 200_2X (step S906B→No), the processing advances to step S908B.

In step S907B, the terminal apparatus 100_2X outputs the guidance information E_X.

In step S908B, the terminal apparatus 100_2X determines whether or not the transmission source of the beacon signal of the predetermined intensity or more that is included in the immediately-previous reception record is a transmission apparatus other than the first transmission apparatus 200_1X and the third transmission apparatus 200_3X, that is, whether or not the beacon signal of the predetermined intensity or more was received from a transmission apparatus other than the first transmission apparatus 200_1X and the third transmission apparatus 200_3X immediately before receiving the beacon signal of the predetermined intensity or more from the second transmission apparatus 200_2X.

In step S909B, the terminal apparatus 100_2X does not output the guidance information.

Processing Performed when Terminal Apparatus 100 Receives Beacon Signal of Predetermined Intensity or more from Third Transmission Apparatus 200_3X

Figure 8C:
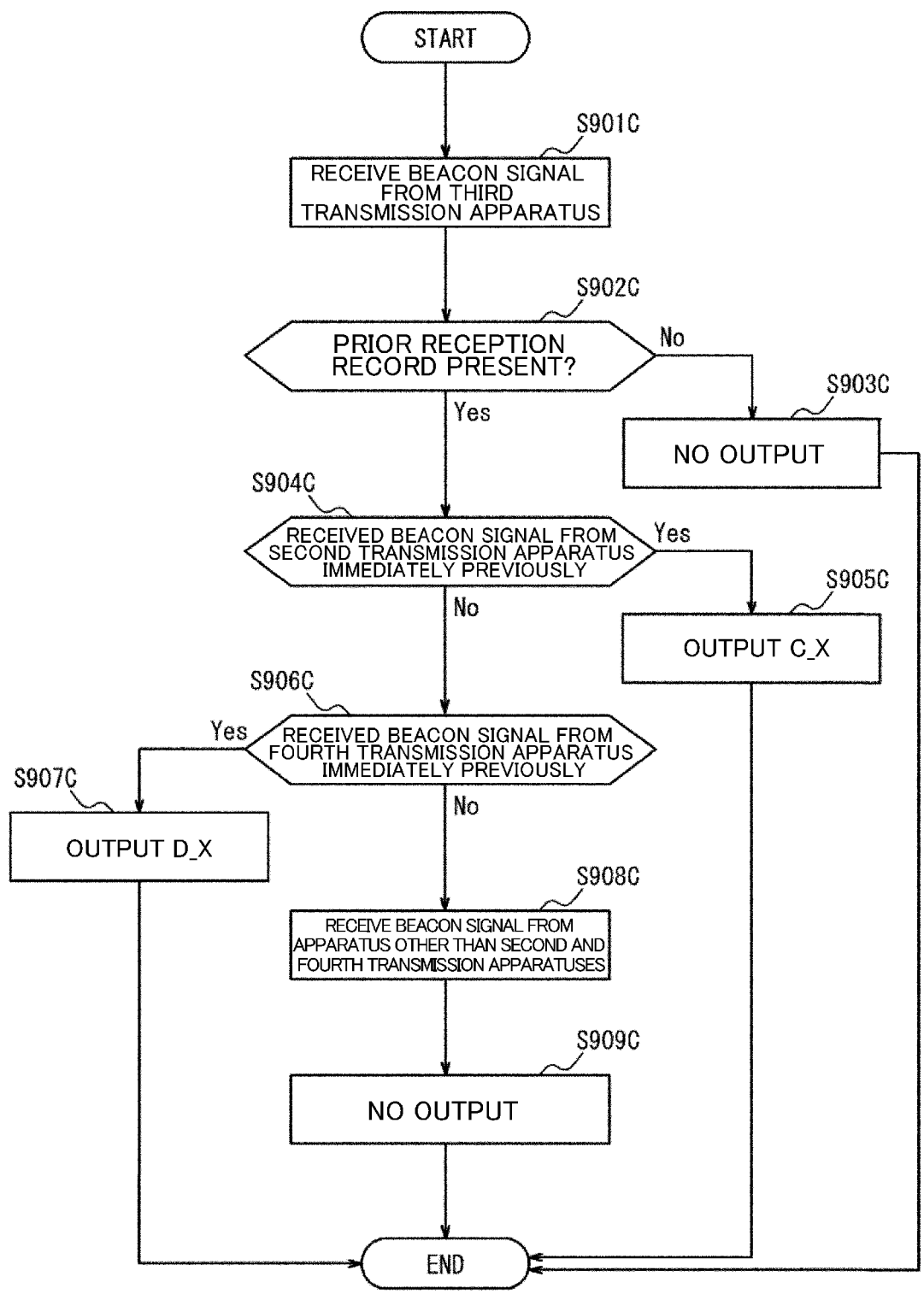
FIG. 8C is a flowchart showing ac example of a processing method of a terminal apparatus according to an embodiment of the present invention.

As shown in FIG. 8C, in step S901C, the terminal apparatus 100_1X and the terminal apparatus 100_2X receive beacon signal of a predetermined intensity or more from the third transmission apparatus 200_3X installed at the position P3.

In step S902C, the terminal apparatus 100_1X and the terminal apparatus 100_2X determine whether or not there is a past reception record. If the terminal apparatus 100_1X and the terminal apparatus 100_2X determine that there is no past reception record (step S902C→No), the processing advances to step S903C. If the terminal apparatus 100_1X and the terminal apparatus 100_2X determine that there is a past reception record (step S902C→Yes), the processing advances to step S904C.

In step S903C, the terminal apparatus 100_1X and the terminal apparatus 100_2X do not output the guidance information.

In step S904C, the terminal apparatus 100_1X and the terminal apparatus 100_2X determine whether or not the transmission source of the beacon signal of the predetermined intensity or more that is included in the immediately-previous reception record is the second transmission apparatus 200_2X, that is, whether or not the beacon signal of the predetermined intensity or more was received from the second transmission apparatus 200_2X immediately before receiving the beacon signal of the predetermined intensity or more from the third transmission apparatus 200_3X. If the terminal apparatus 100_1X and the terminal apparatus 100_2X determine that the beacon signal of the predetermined intensity or more was received from the second transmission apparatus 200_2X immediately before receiving the beacon signal of the predetermined intensity or more from the third transmission apparatus 200_3X (step S904C→Yes), the processing advances to step S905C. If the terminal apparatus 100_1X and the terminal apparatus 100_2X determine that the beacon signal of the predetermined intensity or more was not received from the second transmission apparatus 200_2X immediately before receiving the beacon signal of the predetermined intensity or more from the third transmission apparatus 200_3X (step S904C→No), the processing advances to step S906C.

In step S905C, the terminal apparatus 100_1X outputs the guidance information C_X.

In step S906C, the terminal apparatus 100_2X determines whether or not the transmission source of the beacon signal of the predetermined intensity or more that is included in the immediately-previous reception record is the fourth transmission apparatus 200_4X, that is, whether or not the beacon signal of the predetermined intensity or more was received from the fourth transmission apparatus 200_4X immediately before receiving the beacon signal of the predetermined intensity or more from the third transmission apparatus 200_3X. If the terminal apparatus 100_2X determines that the beacon signal of the predetermined intensity or more was received from the fourth transmission apparatus 200_4X immediately before receiving the beacon signal of the predetermined intensity or more from the third transmission apparatus 200_3X (step S906C→Yes), the processing advances to step S907C. If the terminal apparatus 100_2X determines that the beacon signal of the predetermined intensity or more was not received from the fourth transmission apparatus 200_4X immediately before receiving the beacon signal of the predetermined intensity or more from the third transmission apparatus 200_3X (step S906C→No), the processing advances to step S908C.

In step S907C, the terminal apparatus 100_2X outputs the guidance information D_X.

In step S908C, the terminal apparatus 100_2X determines whether or not the transmission source of the beacon signal of the predetermined intensity or more that is included in the immediately-previous reception record is a transmission apparatus other than the second transmission apparatus 200_2X and the fourth transmission apparatus 200_4X, that is, whether or not the beacon signal of the predetermined intensity or more was received from a transmission apparatus other than the second transmission apparatus 200_2X and the fourth transmission apparatus 200_4X immediately before receiving the beacon signal of the predetermined intensity or more from the third transmission apparatus 200_3X.

In step S909C, the terminal apparatus 100_2X does not output the guidance information.

Processing Performed when Terminal Apparatus 100 Receives Beacon Signal of Predetermined Intensity or more from Fourth Transmission Apparatus 200_4X

Figure 8D:
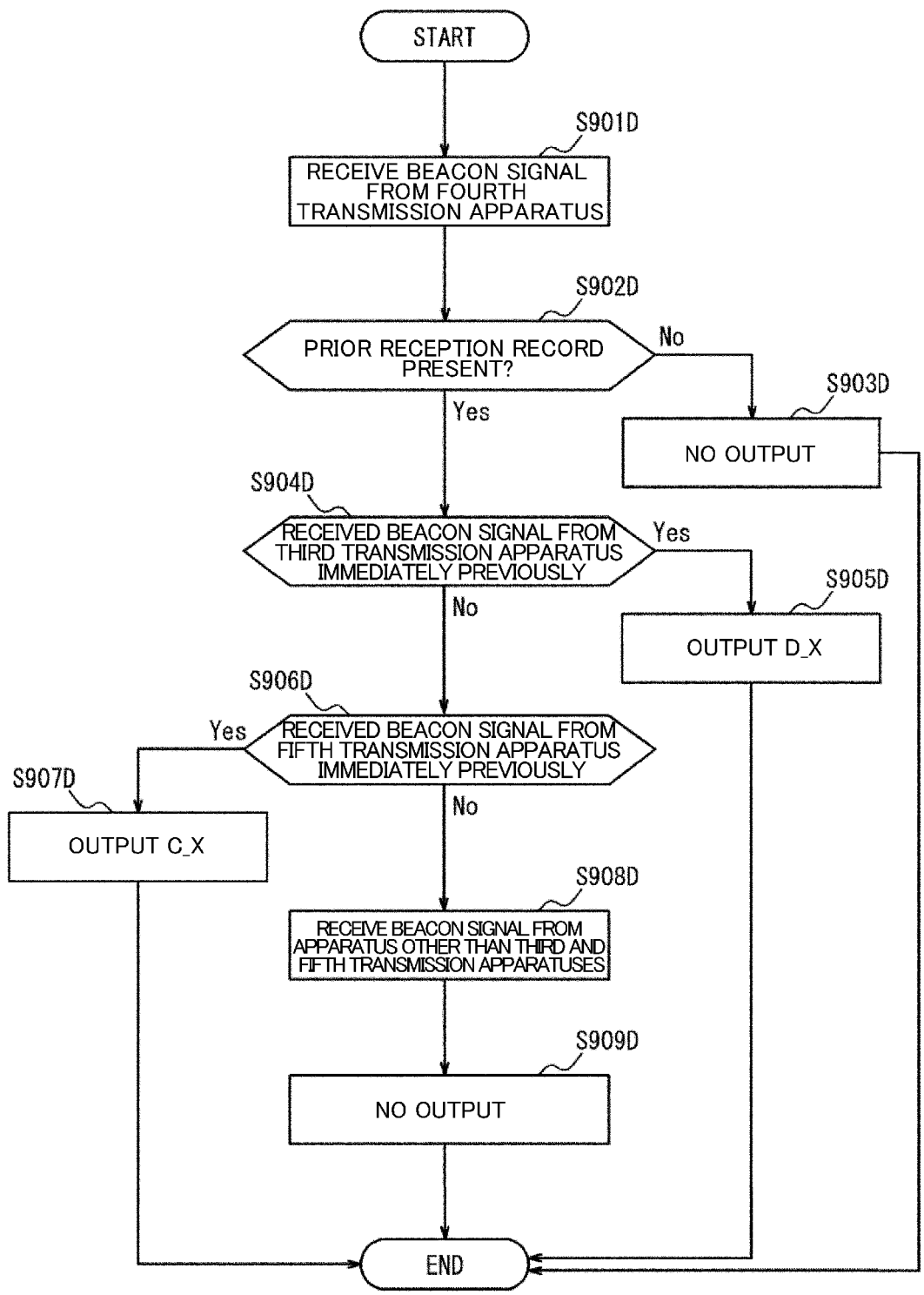
FIG. 8D is a flowchart showing an example of a processing method of a terminal apparatus according to an embodiment of the present invention.

As shown in FIG. 8D, in step S901D, the terminal apparatus 100_1X and the terminal apparatus 100_2X receive a beacon signal of a predetermined intensity or more from the fourth transmission apparatus 200_4X installed at the position P4.

In step S902D, the terminal apparatus 100_1X and the terminal apparatus 100_2X determine whether or not there is a past reception record. If the terminal apparatus 100_1X and the terminal apparatus 100_2X determine that there is no past reception record (step S902D→No), the processing advances to step S903D. If the terminal apparatus 100_1X and the terminal apparatus 100_2X determine that there is a past reception record (step S902D→Yes), the processing advances to step S904D.

In step S903D, the terminal apparatus 100_1X and the terminal apparatus 100_2X do not output the guidance information.

In step S904D, the terminal apparatus 100_1X and the terminal apparatus 100_2X determine whether or not the transmission source of the beacon signal of the predetermined intensity or more that is included in the immediately-previous reception record is the third transmission apparatus 200_3X, that is, whether or not the beacon signal of the predetermined intensity or more was received from the third transmission apparatus 200_3X immediately before receiving the beacon signal of the predetermined intensity or more from the fourth transmission apparatus 200_4X. If the terminal apparatus 100_1X and the terminal apparatus 100_2X determine that the beacon signal of the predetermined intensity or more was received from the third transmission apparatus 200_3X immediately before receiving the beacon signal of a predetermined intensity or more from the fourth transmission apparatus 200_4X (step S904D→Yes), the processing advances to step S905D. If the terminal apparatus 100_1X and the terminal apparatus 100_2X determine that the beacon signal of the predetermined intensity or more was not received from the third transmission apparatus 200_3X immediately before receiving the beacon signal of a predetermined intensity or more from the fourth transmission apparatus 200_4X (step S904D→NO), the processing advances to step S906D.

In step S905D, the terminal apparatus 100_1X outputs the guidance information D_X.

In step S906D, the terminal apparatus 100_2X determines whether or not the transmission source of the beacon signal of the predetermined intensity or more that is included in the immediately-previous reception record is the fifth transmission apparatus 200_5X, that is, whether or not the beacon signal of the predetermined intensity or more was received from the fifth transmission apparatus 200_5X immediately before receiving the beacon signal of the predetermines intensity or more from the fourth transmission apparatus 200_4X. If the terminal apparatus 100_2X determines that the beacon signal of the predetermined intensity or more was received from the fifth transmission apparatus 200_5X immediately before receiving the beacon signal of the predetermined intensity or more from the fourth transmission apparatus 200_4X (step S906D→Yes), the processing advances to step S907D. It the terminal apparatus 100_2X determines that the beacon signal of the predetermined intensity or more was not received from the Fifth transmission apparatus 200_5X immediately before receiving the beacon signal of the predetermined intensity or more from the fourth transmission apparatus 200_4X (step S906A→No), the processing advances to step S908D.

In step S907D, the terminal apparatus 100_2X outputs the guidance information C_X.

In step S908B, the terminal apparatus 100_2X determines whether or not the transmission source of the beacon signal of the predetermined intensity or more that is included in the immediately-previous reception record is a transmission apparatus other than the third transmission apparatus 200_3X and the fifth transmission apparatus 200_5X, that is, whether or not the beacon signal of the predetermined intensity or more was received from a transmission apparatus other than the third transmission apparatus 200_3X and the fifth transmission apparatus 200_5X immediately before receiving the beacon signal of the predetermined intensity or more from the fourth transmission apparatus 200_4X.

In step S909D, the terminal apparatus 100_2X does not output the guidance information.

Figure 8E:
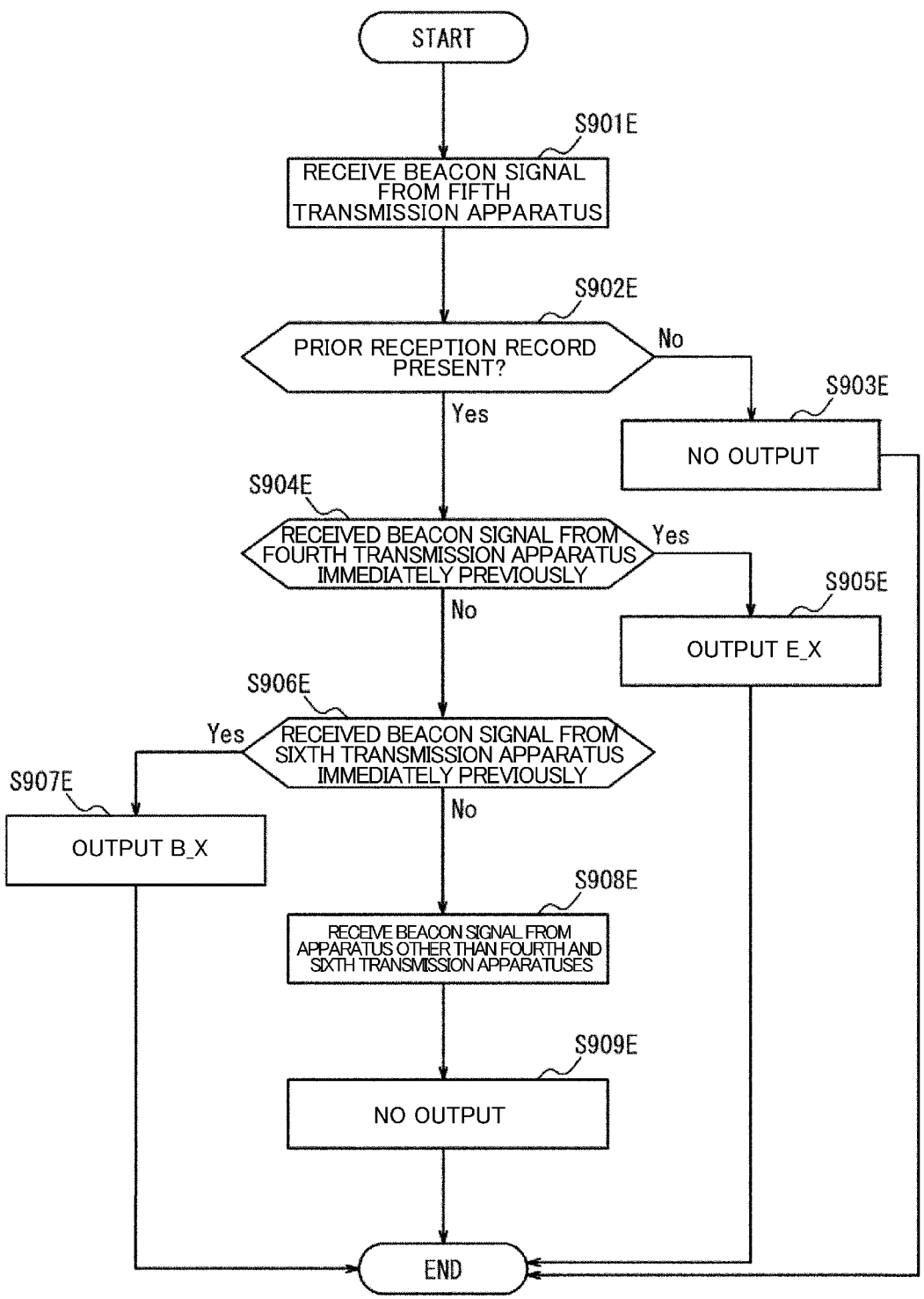
FIG. 8E is a flowchart showing an example of a processing method of a terminal apparatus according to as embodiment of the present invention.

Processing Performed when Terminal Apparatus 100 Receives Beacon Signal of Predetermined Intensity or more from Fifth Transmission Apparatus 200_5X As shown in FIG. 8E, in step S901E, the terminal apparatus 100_1X and the terminal apparatus 100_2X receive a beacon signal of a predetermined intensity or more from the fifth transmission apparatus 200_5X installed at the position P5.

In step S902E, the terminal apparatus 100_1X and the terminal apparatus 100_2X determine whether or not there is a past reception record. If the terminal apparatus 100_1X and the terminal apparatus 100_2X determine that there is no past reception record (step S902E→No), the processing advances to step S903E. If the terminal apparatus 100_1X and the terminal apparatus 100_2X determine that there is a past reception record (step S902E→Yes), the processing advances to step S904E.

In step S903E, the terminal apparatus 100_1X and the terminal apparatus 100_2X do not output the guidance information.

In step S904E, the terminal apparatus 100_1X and the terminal apparatus 100_2X determine whether or not the transmission source of the beacon signal of the predetermined intensity or more that is included in the immediately previous reception record is the fourth transmission apparatus 200_4X, that is, whether or not the beacon signal of the predetermined intensity or more was received from the fourth transmission apparatus 200_4X immediately before receiving the beacon signal of the predetermined intensity or more from the fifth transmission apparatus 200_5X. If the terminal apparatus 100_1X and the terminal apparatus 100_2X determine that the beacon signal of the predetermined intensity or more was received from the fourth transmission apparatus 200_4X immediately before receiving the beacon signal of the predetermined intensity or more from the fifth transmission apparatus 200_5X (step S904E→Yes), the processing advances to step S905E. If the terminal apparatus 100_1X and the terminal apparatus 100_2X determine that the beacon signal of the predetermined intensity or more was not received from the fourth transmission apparatus 200_4X immediately before receiving the beacon signal of the predetermined intensity or more from the fifth transmission apparatus 200_5X (step S904E→No), the processing advances to step S906E.

In step S905E, the terminal apparatus 100_1X outputs the guidance information E_X.

In step S906E, the terminal apparatus 100_2X determines whether or not the transmission source of the beacon signal of the predetermined intensity or more that is included in the immediately-previous reception record is the sixth transmission apparatus 200_6X, that is, whether or not the beacon signal of the predetermined intensity or more was received from the sixth transmission apparatus 200_6X immediately before receiving the beacon signal of the predetermined intensity or more from the fifth transmission apparatus 200_5X. If the terminal apparatus 100_2X determines that the beacon signal of the predetermined intensity or more was received from the sixth transmission apparatus 200_6X immediately before receiving the beacon signal of a predetermined intensity or more from the fifth transmission apparatus 200_5X (step S906E→Yes), the processing advances to step S907E. If the terminal apparatus 100_2X determines that the beacon signal of the predetermined intensity or more was not received from the sixth transmission apparatus 200_6X immediately before receiving the beacon signal of the predetermined intensity or more from the fifth transmission apparatus 200_5X (step S906A→No), the processing advances to step S908E.

In step S907E, the terminal apparatus 100_2X outputs the guidance information B_X.

In step S908E, the terminal apparatus 100_2X determines whether or not the transmission source of the beacon signal of the predetermined intensity or more that is included in the immediately-previous reception record is a transmission apparatus other than the fourth transmission apparatus 200_4 and the sixth transmission apparatus 200_6X, that is, whether or not the beacon signal of the predetermined intensity or more was received from a transmission apparatus other than the fourth transmission apparatus 200_4X and the sixth transmission apparatus 200_6X immediately before receiving the beacon signal of the predetermined intensity or more from the fifth transmission apparatus 200_5X.

In step S909E, the terminal apparatus 100_2X does not output the guidance information.

Figure 8F:
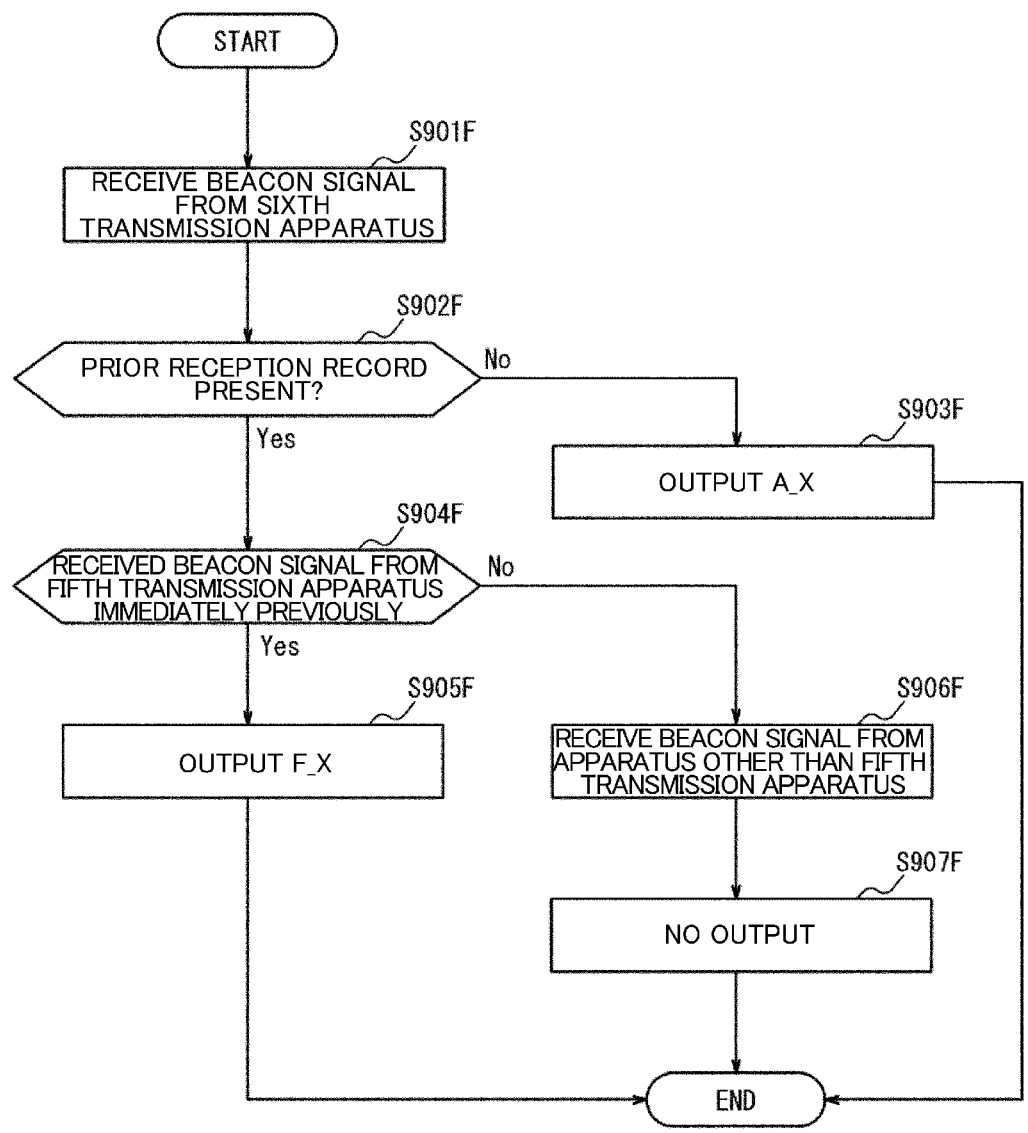
FIG. 8F is a flowchart showing an example of a processing method of a terminal apparatus according to an embodiment of the present invention.
Figure 10:
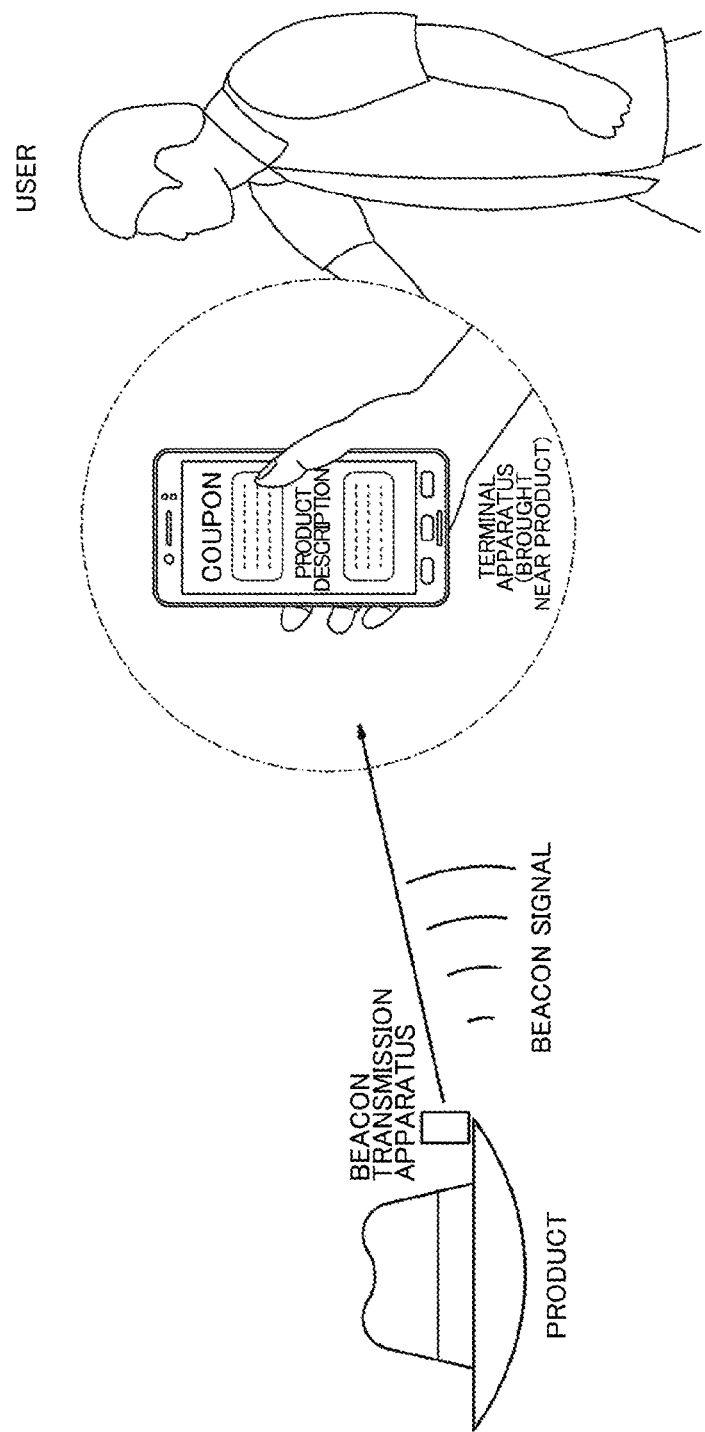
FIG. 10 is a diagram showing an example of a configuration of a communication system according to a conventional example.
Figure 11:
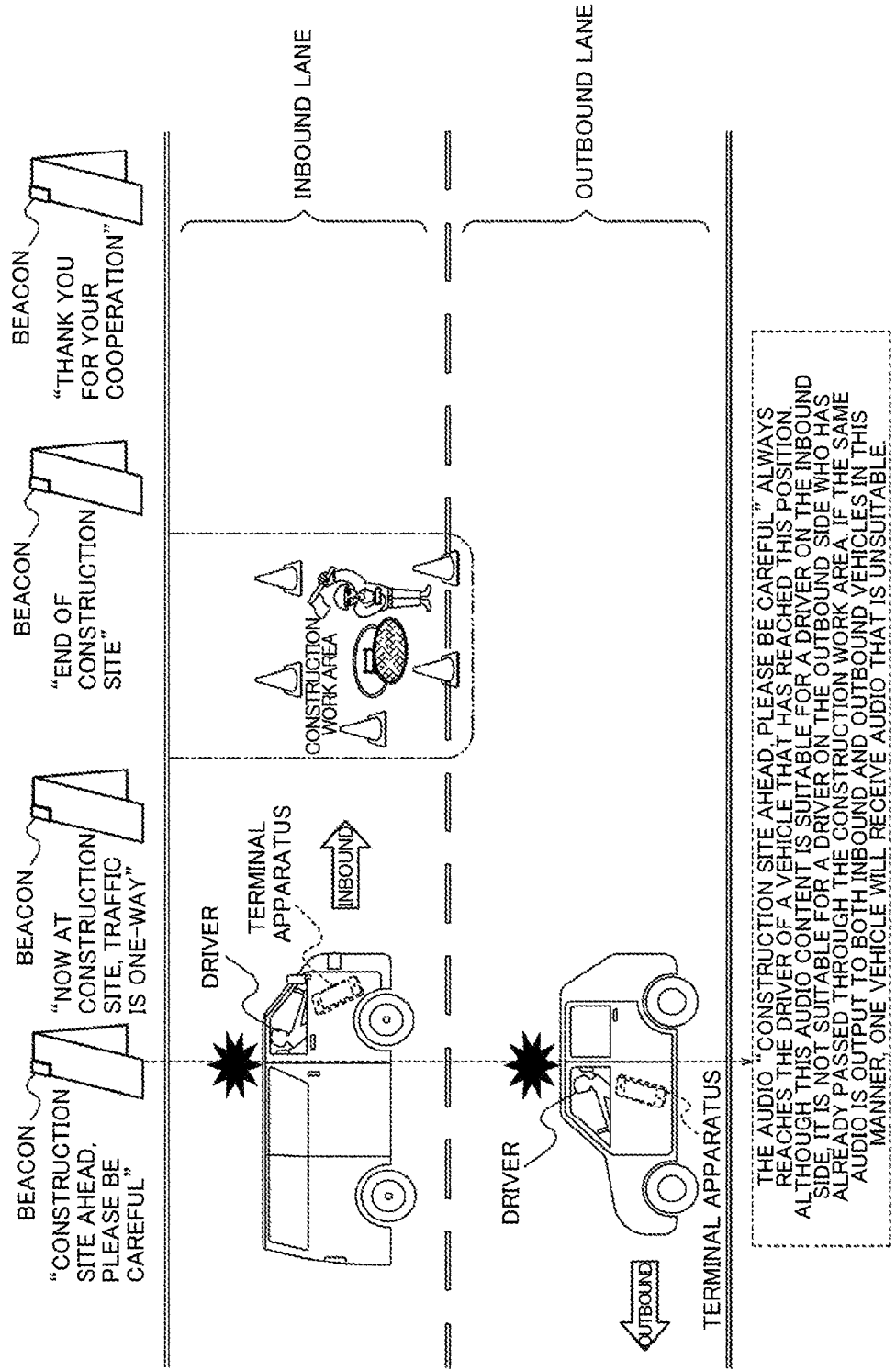
FIG. 11 is a diagram showing an example of a configuration of a communication system according to a conventional example.

Processing Performed when Terminal Apparatus 100 Receives Beacon Signal of Predetermined Intensity or more from Sixth Transmission Apparatus 200_6X As shown in FIG. 8F, in step S901E, the terminal apparatus 100_1X and the terminal apparatus 100_2X receive a beacon signal of a predetermined intensity or more from the sixth transmission apparatus 200_6X installed at the position P6.

In step S902F, the terminal apparatus 100_1X and the terminal apparatus 100_2X determine whether or not there is a past reception record. If the terminal apparatus 100_1X and the terminal apparatus 100_2X determine that there is no past reception record (step S902F→No), the processing advances to step S903F. If the terminal apparatus 100_1X and the terminal apparatus 100_2X determine that there is a past reception record (step S902F→Yes), the processing advances to step S904F.

In step S903F, the terminal apparatus 100_2X outputs the guidance information F_X.

In step S904F, the terminal apparatus 100_1X determines whether or not the transmission source of the beacon signal of the predetermined intensity or more that is included in the immediately-previous reception record is the fifth transmission apparatus 200_5X, that is, whether or not the beacon signal of the predetermined intensity or more was received from the fifth transmission apparatus 200_5X immediately before receiving the beacon signal of the predetermined intensity or more from the sixth transmission apparatus 200_6X. If the terminal apparatus 100_1X determines that the beacon signal of the predetermined intensity or more was received from the fifth transmission apparatus 200_5X immediately before receiving the beacon signal of the predetermined intensity or more from the sixth transmission apparatus 200_6X (step S904F→Yes), the processing advances to step S905F. If the terminal apparatus 100_1X determines that the beacon signal of the predetermined intensity or more was not received from the fifth transmission apparatus 200_5X immediately before receiving the beacon signal of a predetermined intensity or more from the sixth transmission apparatus 200_6X (step S904F→No), the processing advances to step S906F.

In step S905F, the terminal apparatus 100_1X outputs the guidance information A_X.

In step S906F, the terminal apparatus 100_1X determines whether or not the transmission source of the beacon signal of the predetermined intensity or more that is included in the immediately-previous reception record is a transmission apparatus other than the fifth transmission apparatus 200_5X, that is, whether or not the beacon signal or the predetermined intensity or more was received from a transmission apparatus other than the fifth transmission apparatus 200_5X immediately before receiving the beacon signal of the predetermined intensity or more from the sixth transmission apparatus 200_6X.

In step S907F, the terminal apparatus 100_1X does not output the guidance information.

As described above, the terminal apparatus 100_1X that is mounted in the vehicle 10_1X traveling in the inbound lane 601X and the terminal apparatus 100_2X that is mounted in the vehicle 10_2X traveling in the outbound lane 602 perform predetermined processing.

Next, the tester has the user U_1X end the driving of the vehicle 10_1X in which the terminal apparatus 100_1X is mounted. Also, the tester has the user U_2X end the driving of the vehicle 10_2X in which the terminal apparatus 100_2X is mounted.

Next, the tester verifies what kind of audio was output by the terminal apparatus 100_1X possessed by the user U_1X while the vehicle 10_1X was traveling in the inbound lane 601X. Also, the tester verifies what kind of audio was output by the terminal apparatus 100_2X possessed by the user U_2X while the vehicle 10_2X was traveling in the outbound lane 602X.

FIG. 9 is a diagram showing one example of the verification results obtained using the communication system 1 according to the present embodiment.

When the beacon signal was received from the first transmission apparatus 200_1X while the vehicle 10_1X was traveling in the inbound lane 601X, the user U_1X heard the guidance information "Telephone construction ahead. Telephone construction is in progress ahead.", which was output from the terminal apparatus 100_1 through audio in the vehicle. Accordingly, the tester verified that suitable information was presented to the user U_1X by the communication system 1.

When the beacon signal was received from the second transmission apparatus 200_2X while the vehicle 10_1X was traveling in the inbound lane 601X, the user U_1X heard the guidance information "Telephone construction site approaching. Telephone construction is nearby.", which was output from the terminal apparatus 100_1 through audio in the vehicle. Accordingly, the tester verified that suitable information was presented to the user U_1X by the communication system 1.

When the beacon signal was received from the third transmission apparatus 200_3X while the vehicle 10_1X was traveling in the inbound lane 601X, the user U_1X heard the guidance information "Near telephone construction site. Entering telephone construction area." which was output from the terminal apparatus 100_1 through audio in the vehicle. Accordingly, the tester verified that suitable information was presented to the user U_1X by the communication system 1.

When the beacon signal was received from the fourth transmission apparatus 200_4X while the vehicle 10_1X was traveling in the inbound lane 601X, the user U_1X heard the guidance information "Now at construction site. Telephone construction is in progress.", which was output from the terminal apparatus 100_1 through audio in the vehicle. Accordingly, the tester verified that suitable information was presented to the user U_1X by the communication system 1.

When the beacon signal was received from the fifth transmission apparatus 200_5X while the vehicle 10_1X was traveling in the inbound lane 601X, the user U_1X heard the guidance information "End of construction area. Exiting construction area.", which was output from the terminal apparatus 100_1 through audio in the vehicle. Accordingly, the tester verified that suitable information was presented to the user U_1X by the communication system 1.

When the beacon signal was received from the sixth transmission apparatus 200_6X while the vehicle 10_1X was traveling in the inbound lane 601X, the user U_1X heard the guidance information "Thank you for cooperating with telephone construction. Thank you for your cooperation", which was output from the terminal apparatus 100_1 through audio in the vehicle. Accordingly, the tester verified that suitable information was presented to the user U_1X by the communication system 1.

Also, when the beacon signal was received from the first transmission apparatus 200_1X while the vehicle 10_2X was traveling in the outbound lane 602X, the user U_2X heard the guidance information "Telephone construction ahead. Telephone construction is in progress ahead.", which was output from the terminal apparatus 100_2 through audio in the vehicle. Accordingly, the tester verified that suitable information was presented to the user U_2X by the communication system 1.

When the beacon signal was received from the second transmission apparatus 200_2X while the vehicle 10_2X was traveling in the outbound lane 602X, the user U_2X heard the guidance information "Telephone construction site approaching. Telephone construction is nearby.", which was output from the terminal apparatus 100_2 through audio in the vehicle. Accordingly, the tester verified that suitable information was presented to the user U_2X by the communication system 1.

When the beacon signal was received from the third transmission apparatus 200_3X while the vehicle 10_2X was traveling in the outbound lane 602X, the user U_2X heard the guidance information "Near telephone construction site. Entering telephone construction area.", which was output from the terminal apparatus 100_2 through audio in the vehicle. Accordingly, the tester verified that suitable information was presented to the user U_2X by the communication system 1.

When the beacon signal was received from the fourth transmission apparatus 200_4X while the vehicle 10_2X was traveling in the outbound lane 602X, the user U_2X heard the guidance information "Now at construction site. Telephone construction is in progress.", which was output from the terminal apparatus 100_2 through audio in the vehicle. Accordingly, the tester verified that suitable information was presented to the user U_2X by the communication system 1.

When the beacon signal was received from the fifth transmission apparatus 200_5X while the vehicle 10_2X was traveling in the outbound lane 602X, the user U_2X heard the guidance information "End of construction area. Exiting construction area.", which was output from the terminal apparatus 100_2 through audio in the vehicle. Accordingly, the tester verified that suitable information was presented to the user U_2X by the communication system 1.

When the beacon signal was received from the sixth transmission apparatus 200_6X while the vehicle 10_2X was traveling in the outbound lane 602X, the user U_2X heard the guidance information "Thank you for cooperating with telephone construction. Thank you for your cooperation.", which was output from the terminal apparatus 100_2 through audio in the vehicle. Accordingly, the tester verified that suitable information was presented to the user U_2X by the communication system 1.

Based on the above-described verification results, the tester verified that suitable information was presented to the user by the communication system 1 according to the present embodiment.

Variations

In the present embodiment, description was given taking, as an example, a case in which a communication system 1 is applied to a transmission apparatus installed on a road that is under construction and a terminal apparatus possessed by a driver of a vehicle traveling on the road that is under construction, but there is no limitation to the application example of the communication system 1.

In the present embodiment, description was given taking, as an example, a case in which a "moving body" is a vehicle, but "moving body" is not limited to a vehicle. The "moving body" in the present embodiment includes a vehicle, watercraft, and aircraft. Although vehicles include automobiles and industrial vehicles, there is no limitation to this, and it is also possible to include railroad vehicles, lifestyle vehicles, and fixed-wing aircraft traveling on a runway. Examples of automobiles may include but are not limited to passenger cars, trucks, buses, two vehicles, and trolley buses, and may include other vehicles that travel on a road. Examples of industrial vehicles include industrial vehicles for agriculture and construction. Examples of industrial vehicles include but are not limited to forklifts and golf carts. Examples of industrial vehicles for agriculture include but are not limited to tractors, tilling machines, transplanting machines, binders, combines, and lawnmowers. Examples of industrial vehicles for construction include but are not limited to bulldozers, scrapers, shovel cars, crane vehicles, dump cars, and road rollers. Vehicles that travel by manpower are included. The category of the vehicle is not limited to those described above. For example, automobiles may include industrial vehicles that can travel on a road, and the same vehicle may be included in multiple categories. Examples of watercraft according to the present embodiment include jet skis, boats, and tankers. Examples of aircraft according to the present embodiment include fixed-wing aircraft, and rotary-wing aircraft.

Other Variations

For example, it is preferable that a developer prepares various types of programs in advance based on the road width, the number of lanes, the directions in which the road branches, the number of transmission apparatuses, the positions of the transmission apparatuses, and the like. This makes it possible to apply the communication system 1 according to the present embodiment in various environments. This program may also be recorded on a computer-readable recording medium. The program can be installed in a computer if such a recording medium is used. Here, the recording medium in which the program is recorded may also be a non-transitory recording medium. The non-transitory recording medium may be a CD (Compact Disk)-ROM (Read-Only Memory), a DVD (Digital Versatile Disc)-ROM, a BD (Blue-Ray (registered trademark) Disc)-ROM, or the like. The program can also be provided by downloading via a network.

Although the above-described embodiments were described as representative examples, it is evident to a person skilled in the art that many modifications and replacements are possible within the gist and scope of the present invention. Accordingly, the present invention is not to be understood as being limited by the above-described embodiments, and various modifications and changes are possible without departing from the claims. For example, multiple configurational blocks according to a configurational diagram of an embodiment can be combined into one, or one configurational block can be divided.

REFERENCE SIGNS LIST

1 Communication system
10 Vehicle (moving body)
100 Terminal apparatus
101 Reception unit
102 Storage unit
103 Control unit
104 Output unit
105 Input unit
200 Transmission apparatus
201 Control unit
202 Storage unit
203 Transmission unit
204 Detection unit
205 Power source unit
U User

The invention claimed is:

1. A communication system comprising:
   a plurality of transmission apparatuses configured to transmit beacon signals to a moving body; and
   a terminal apparatus mounted in the moving body, the terminal apparatus configured to:
      receive a beacon signal of at least a predetermined intensity from a transmission apparatus of the plurality of transmission apparatuses, wherein the beacon signal is associated with a plurality of guidance information items, and wherein the plurality of guidance information items are each part of a sequence of guidance information items;
      upon the receipt of the beacon signal of at least the predetermined intensity, select one of the plurality of guidance information items based on a past reception record; and
      present the selected guidance information item to a user.

2. The communication system according to claim 1, wherein the terminal apparatus selects the guidance information item based on whether or not the past reception record is present.

3. The communication system according to claim 1, wherein the terminal apparatus selects the guidance information item based on a transmission source of the beacon signal of the at least the predetermined intensity in the past reception record.

4. The communication system according to claim 2, wherein the terminal apparatus selects the guidance information item based on a transmission source of the beacon signal of the at least the predetermined intensity or more that is included in the past reception record.

5. A terminal apparatus to be mounted in a moving body to which beacon signals are transmitted from a plurality of transmission apparatuses, the terminal apparatus comprising:
   a receiver configured to receive a beacon signal of at least a predetermined intensity from a transmission apparatus of the plurality of transmission apparatuses;
   a store configured to store a reception record of the beacon signal of the predetermined intensity or more;
   a controller configured to select one of a plurality of guidance information based on a past reception record; and
   a presenter configured to present the one of the plurality of guidance information to a user, wherein the one of the plurality of guidance information being part of a sequence of guidance information, and the received beacon signal being associated with the one of the plurality of guidance information.

6. The terminal apparatus according to claim 5, wherein the terminal apparatus selects the guidance information based on whether or not the past reception record is present.

7. The terminal apparatus according to claim 5, wherein the terminal apparatus selects the guidance information based on a transmission source of the beacon signal of the predetermined intensity or more that is included in the past reception record.

8. The terminal apparatus according to claim 6, wherein the terminal apparatus selects the guidance information item based on a transmission source of the beacon signal of the at least the predetermined intensity in the past reception record.

9. A communication method for a communication system including a plurality of transmission apparatuses and a terminal apparatus mounted in a moving body, the communication method comprising:
   receiving, by the terminal apparatus, beacon signals from a transmission apparatus of the plurality of transmission apparatuses to the moving body;
   upon receiving a beacon signal of at least a predetermined intensity from the transmission apparatus of the plurality of transmission apparatuses, selecting one of a plurality of guidance information items based on a past reception record; and
   presenting, by the terminal apparatus, the one of the plurality of guidance information items to a user, wherein the one of the plurality of guidance information items being part of a sequence of guidance information items, and the received beacon signal being associated with the one of the plurality of guidance information items.

10. The communication method according to claim 9, further comprising:
    selecting the guidance information item based on whether or not the past reception record is present.

11. The communication method according to claim 9, further comprising a step of selecting the guidance information item based on a transmission source of the beacon signal of the at least the predetermined intensity in the past reception record.

12. The communication method according to claim 10, further comprising a step of selecting the guidance information item based on a transmission source of the beacon signal of the at least the predetermined intensity in the past reception record.

* * * * *